US006664965B1

(12) United States Patent
Yamamoto et al.

(10) Patent No.: US 6,664,965 B1
(45) Date of Patent: Dec. 16, 2003

(54) IMAGE PROCESSING DEVICE AND INFORMATION RECORDING MEDIUM

(75) Inventors: Makoto Yamamoto, Tokyo (JP); Kenji Tohma, Tokyo (JP); Shinobu Hayashi, Tokyo (JP); Tsuyoshi Matsuda, Tokyo (JP); Yoshitaka Maeyama, Tokyo (JP); Tomoya Takasugi, Narashino (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/369,302

(22) Filed: Aug. 6, 1999

(30) Foreign Application Priority Data

Aug. 7, 1998 (JP) .......................... 10-236540
Nov. 24, 1998 (JP) .......................... 10-349349

(51) Int. Cl.$^7$ ............................. G06T 15/00
(52) U.S. Cl. ..................................... 345/473
(58) Field of Search ...................... 345/473, 474, 345/475, 419, 619

(56) References Cited

U.S. PATENT DOCUMENTS

| 5,475,802 | A | * | 12/1995 | Westcott et al. ............ 395/129 |
| 5,963,668 | A | * | 10/1999 | Horikawa et al. .......... 382/203 |
| 6,275,236 | B1 | * | 8/2001 | Delahunty .................. 345/473 |
| 6,278,455 | B1 | * | 8/2001 | Baker ......................... 345/473 |

FOREIGN PATENT DOCUMENTS

| EP | 0 778 548 A1 | 6/1997 |
| EP | 1 002 559 A1 | 5/2000 |
| WO | WO 95/35555 | 12/1995 |
| WO | WO 97 41535 | 11/1997 |

OTHER PUBLICATIONS

Schaufler G., "Exploiting Frame–to–Frame Coherence in a Virtual Reality System," Virtual Reality Annual International Symposium, 1996, Proceedings of the IEEE 1996 Santa Clara, CA, USA Mar. 30–Apr. 3, 1996, Los Alamitos, CA, USA, IEEE Comput. Soc., US, Mar. 30, 1996, pp. 95–102.

Nishino H. et al., "A 3D Virtual Environment for Creating New Fireworks," Virtual Reality Software and Technology, Proceedings of the VRST Conference, Jul. 1, 1996, pp. 43–50.

\* cited by examiner

*Primary Examiner*—Phu K. Nguyen
(74) *Attorney, Agent, or Firm*—Finnegan, Henderson, Farabow, Garrett & Dunner, L.L.P.

(57) ABSTRACT

An image processing device for realizing more realistic pictures of explosions in video game devices and the like. Objects displaying such pictures of explosions are formed of spherical polygons (R1, R2, R3, . . . ) and planar polygons (S1, S2, S3, . . . ). Pictures of explosions are realized by alternately arranging these spherical polygons and planar polygons with the lapse in time. Preferably, pictures of polygons are realized by arranging the spherical polygons in layers on the boundary of the planar polygons.

8 Claims, 25 Drawing Sheets

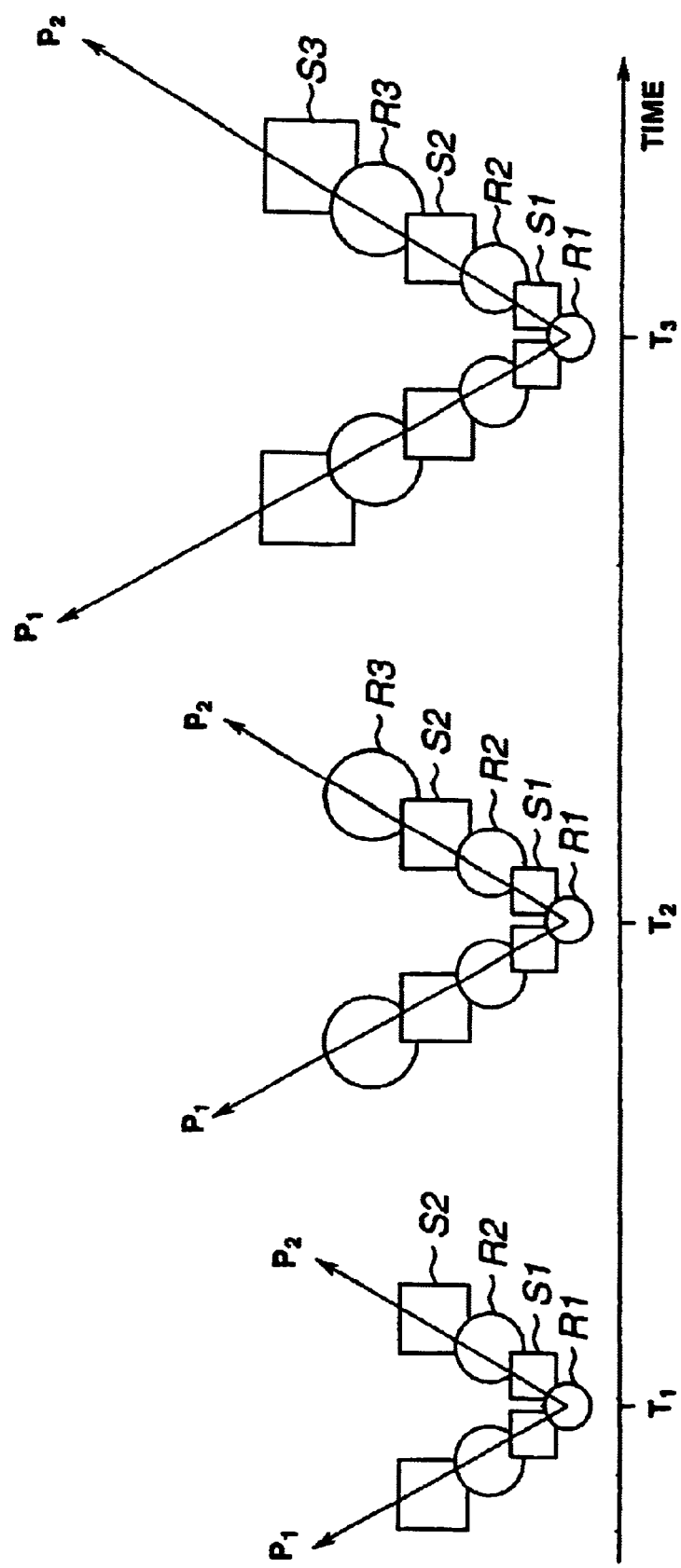

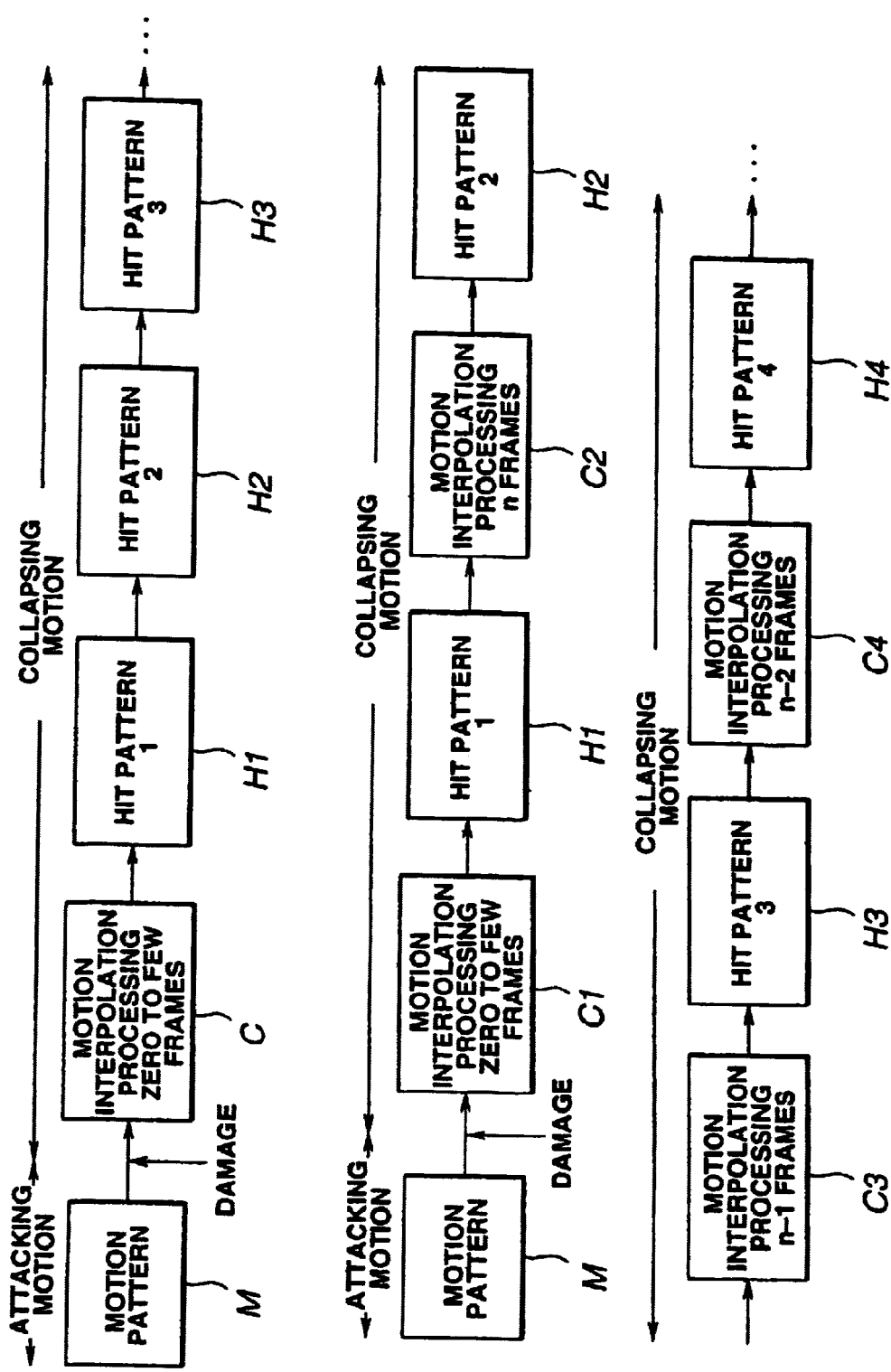

FIG.23A  FIG.23B

IMAGE PROCESSING DEVICE AND INFORMATION RECORDING MEDIUM

BACKGROUND OF THE INVENTION

1. Field of the Invention

The present invention relates to image processing technology in video game devices.

2. Description of the Related Art

Pursuant to the progress in computer graphics (CG) technology, a virtual world can now be represented even more realistically. A video game device utilizes such CG technology.

As an example of a video game, there is a shooting game. This type of game device is generally equipped with a gun unit, CPU for graphics processing, monitor, and so on. When a player aims the gunpoint at a target (enemy character) appearing on the monitor screen and pulls the trigger on a gun unit, the game device detects the position on the monitor screen of the light signal emitted from the gun unit, and performs image processing such as processing for destroying the enemy character based on such position data.

As one example of a typical gun shooting game heretofore, there is "Virtua Cop (Trademark)" manufactured by Sega Enterprises, Ltd. In this gun game, players compete for scores by using a gun unit and shooting down enemy characters appearing in the virtual three-dimensional space (game space) on the monitor screen. Here, an enemy character appears at a predetermined location on the monitor screen in a predetermined timing. When the player directs the gunpoint of the gun unit toward the enemy character, the viewpoint on the monitor screen approaches the enemy and such enemy character is enlarged and displayed on the monitor screen. Actions of the enemy character are controlled by an image processing program loaded in a game device and, when required, the enemy character attacks the player viewing the monitor screen.

However, the inventors have discovered through intense study that the following problems must be resolved in order to increase the reality of the game and represent the picture more realistically.

First, processing of explosion pictures in a conventional shooting game uses, for example, planar polygons and spherical polygons in order to decrease the amount of polygon data for representing explosion pictures. A texture of explosion pictures is affixed to these polygons and the animation of explosions is realized by rotating etc., this texture. Processing of explosion pictures using planar polygons is disclosed in International Publication No. WO95/35555. According to this method, polygons such as explosion patterns are always facing the direction of the line of sight and inconveniences upon using planar polygons (necessity to make the plane always face the direction of the line of sight) are resolved as it comprises camera control matrix processing means, object matrix processing means, and object pattern display processing means.

However, when representing explosion pictures with planar polygons, the boundary between the explosion picture and background becomes unnatural, resulting in the picture lacking reality. In other words, there is an inconvenience that the boundary between the explosion picture and background is a straight line. Moreover, when representing explosion pictures with spherical polygons, the explosion picture becomes monotonous, resulting in the picture lacking reality. Thus, a more realistic explosion picture is desired.

Second, upon realizing explosion pictures by combining a plurality of polygons, conventionally, explosion patterns concerning all such combinations were registered in a prescribed storage field. Reference is made to FIG. 6(A) and FIG. 7 for the explanation thereof. FIG. 6(A) shows four combinations of explosion data A1, B1, B2, C1, and C2 (patterns (1) through (4)) structuring the explosion object. FIG. 7 shows the explosion pictures represented by the combination of such explosion data. Pattern (1) corresponds to FIG. 7(A), pattern (2) to FIG. 7 (B), pattern (3) to FIG. 7(C), and pattern (4) to FIG. 7(D), respectively. Conventionally, explosion data was registered in advance for each of these four patterns, and one pattern was displayed by being selected optionally from the registered explosion patterns upon processing explosion pictures.

However, registering the explosion data in advance for all explosion patterns led to a problem in that the necessary memory increases pursuant to the increase in the variations of explosion patterns.

Third, there is a problem in that the movement of characters is unnatural because the motion interpolation processing in between the two different motions was insufficient heretofore. Motion interpolation processing is, for example, image processing to smoothly connect two motion changes (changes in motion patterns), such as from an "attacking motion" to a "collapsing motion," when an enemy character in an attacking mode is shot. Conventional motion interpolation processing is explained with reference to FIG. 8(A). When the enemy character is in an attacking motion, the enemy character attacks with a predetermined motion pattern (motion pattern M). If the enemy character is damaged by the attack made by the player character, the enemy character makes a transition from an "attacking motion" to a "collapsing motion." A plurality of patterns are predetermined for this "collapsing motion" and one of those patterns is selected in accordance with the situation of the enemy character being damaged or the game environment at such time, etc. Further, the "collapsing motion" is structured of a plurality of motion patterns (hit pattern H1, hit pattern H2, . . . ). Motion interpolation processing C is performed during the several frames when the transition from motion pattern M to hit pattern H1 is being made. Thus, the unnaturalness of the sudden transition from motion pattern M to hit pattern Hi can be solved as it will be in slow motion during such transition.

Nonetheless, as this method only performs motion interpolation processing C during the transition period from motion pattern M to hit pattern H1, changes in the motion are only slowed down temporarily and unnaturalness still existed when viewed as a whole.

Fourth, in conventional shooting games, enemy characters shot by bullets retreat straight back regardless of where the bullet hit or the destructive power of the bullet. Thus, when shooting with the likes of a machinegun which successively fires bullets, the shooting becomes easy as there is no change in the two-dimensional position of the enemy character, resulting in the amusement being lowered. This point is explained with reference to FIG. 9. As shown in FIG. 9(A), the enemy character retreats from position E1 to position E2 regardless of the position at which the enemy character is shot. The direction of retreat is parallel to the player's line of sight. Therefore, the game screen seen from the player's side, as shown in FIG. 9(B), only shows the changes of the enemy character moving from position E1 to E2. As there is no change in the two-dimensional position of the enemy character when seen from the player's side, the shooting is easy and the amusement is lowered.

Fifth, when the enemy character is attacked and it is to counterattack after the collapsing motion (shot-down motion), an opportunity is provided to the player for shooting if the enemy character starts the attacking motion from the very beginning, resulting in a problem that the amusement of the game is lowered. This point is explained with reference to FIG. 11 (A). Suppose that the enemy character is attacking in the attacking motion pursuant to predetermined attacking steps $M_1$, $M_2$ ... $M_{n-1}$, $M_n$. Here, for example, $M_1$ is an attacking step of holding the gun at a ready, $M_2$ is an attacking step of aiming the gun, $M_3$ is an attacking step of firing the bullet from the gun, and soon. Further suppose that the enemy character, during attacking step $M_3$, is damaged upon being attacked by the player character. The enemy character will make a transition to the "shot-down motion" and, after the completion of such "shot-down motion," will return to the first step of the attacking motion, that is, attacking step $M_1$. Thereafter, as the enemy character will perform in order attacking steps $M_1$, $M_2$ ... $M_{n-1}$, $M_n$, it can not readily counterattack the player character. In other words, this provides the player character an opportunity to attack while the enemy character is performing attacking steps $M_1$, $M_2$, resulting in a problem that the amusement of the game is lowered. Although it is possible to disregard the "shot-down motion" upon the enemy character being attacked, this will also result in the amusement of the game being lowered as the player will not be able to enjoy the feeling of the bullet hitting the target.

Sixth, there is a problem in relation to the flight locus of a bullet seen from the line of sight of the player character. As shown in FIG. 12(A), conventional shooting games displayed the flight locus of a bullet seen from a moving player character as a flight locus of a bullet having the resulting speed vector upon subtracting the player character's speed vector from the bullet's speed vector. Therefore, when the moving direction of the bullet and the moving direction of the player character were the exact opposite, the speed of the outward appearance of the bullet is increased and the player is unable to react to such speed.

Seventh, there is a problem in the acceleration of the collision judgment. Here, collision judgment is the judgment of whether two objects collided and an example thereof is the collision judgment of a bullet and a building. This collision judgment is simplified by modeling the bullet as a line segment and the building as a plane and obtaining the intersection thereof. As conventional collision judgments judged the collision of the bullet (line segment polygon) with every building (planar polygon), high-speed game processing was hindered due to the excessive time required for the calculation. Moreover, as shown in FIG. 13, when a car operated by the player moves along a road preformed on a game space, the area in which the car may move is restricted to the road. Thus, the virtual area for collision judgment, area 1, area 2, and so on are formed along the road. And, as shown in FIG. 14(A), buildings (building 1, building 2, and so on) existing within each respective area are stored in advance in correspondence therewith. Collision judgment between the bullet fired from the player character driving the car and the aforementioned buildings is performed by, as shown in FIG. 14(B), checking each area to determine in which area the bullet exists (step B1). This area check is conducted by comparing the coordinates of the bullet modeled as a line segment polygon and the coordinates of each area. After confirming the area in which the bullet exists, collision judgment is performed with respect to each of the buildings existing in such area (step B2). According to this method, collision judgment between the line segment polygon representing the bullet and the planar polygon representing the building can be accelerated as only a planar polygon within a prescribed area need only be judged. However, as the aforementioned area only exists in a limited area of the game space, there is an inconvenience in that collision judgment can not be performed in a region not including such area. There is also another problem with this method in that game programs are complicated as polygons for areas need to be provided according to game scenes.

Eighth, in shooting games, there is a problem with representing wave motions consequent of explosions of the bullet and the like. As techniques of representing waves, for example, pattern change and texture scroll are known. Pattern change is a technique of displaying waves by modeling every condition of the wave motion and switching each model to the same position. With this technique, there is a problem in that the amount of data is increased as models for every condition of a wave must be prepared in advance. Texture scroll is a technique of preparing textures representing waves and displaying waves on the polygons by scrolling such textures. However, it is not possible to represent a three-dimensional wave as only planar pictures move according to this technique. Thus, a technique of representing realistic three-dimensional waves with a small amount of data is desired.

Ninth, when a game story is made from a plurality of stages and the order of such stages is predetermined in a game program, there is a problem in that the progress of the game is monotonous. Therefore, it is considered that the amusement in the game will increase if it is possible to change the progress of the game according to the player's intention.

Tenth, in conventional game devices, for example, there is a type wherein prescribed vibration is delivered to the player upon the explosion of enemy characters. In such conventional devices, the vibration generating device was driven by a sound signal generated pursuant to the sound data of background music and the like. This led to the vibration generating device picking up the aforementioned sound signals even during scenes having no relation to the explosion of enemy characters, resulting in unnatural vibrations.

SUMMARY OF THE INVENTION

The present invention was devised in view of the aforementioned problems of the conventional art. An object thereof is to provide an image processing device and information recording medium preferable for gun shooting games and the like, superior in reality and naturalness in comparison to the games heretofore, and capable of considerably enhancing the game feeling as well as the interest in the game. Another object of the present invention is to reduce the burden of the operation processing during image processing. A further object is to provide a vibration generating device for generating appropriate vibrations in accordance with game scenes.

An image processing device of the present invention for displaying a picture of an object changing forms within a predetermined time frame comprises a storage means for storing spherical polygon data and planar polygon data forming the object, and image generating means for reading such spherical polygon data and planar polygon data from the storage means and generating images of the object by combining spherical polygons and planar polygons.

Preferably, the image generating means sets the direction of the form change of the object and, by alternately arranging the spherical polygon data and planar polygon data along this direction as well as covering the boundary of planar polygons with spherical polygons, obtains images of the object.

By covering the boundary of planar polygons with spherical polygons as mentioned above, it becomes difficult to distinguish that the polygons are planar, thereby realizing realistic and natural images. Further, by representing images by arranging spherical polygons at the boundary of planar polygons, it is possible to avoid the unnaturalness of the boundary of the planar polygons, thereby realizing realistic form changes of an object. The aforementioned object, for example, is effective if it is an object representing an explosion.

An image processing device of the present invention for displaying a picture of an object changing forms within a predetermined time frame comprises a storage means for storing hierarchically, with respect to each possible form adoptable by an object, the relation between the plurality of structural elements structuring the object, and an image generating means for generating images of the object by selecting hierarchically one optional form among the plurality of forms adoptable by such object and reading from the storage means for each hierarchy the structural element corresponding to such form. According to this structure, it is possible to keep the data of an object to a minimum, thereby enabling the efficient usage of memory. The aforementioned object, for example, is effective if it is an object representing an explosion.

An image processing device of the present invention for representing a series of motions of an object comprises a storage means for storing in advance the motion patterns of the object, and an image generating means for generating images of such object by alternately repeating, upon the motion pattern of the object changing, the step of performing motion interpolation processing of an object and displaying the result on the screen and the step of reading the motion pattern after the change from the storage means and displaying the result on the screen, and gradually decreasing the number of times the motion interpolation processing is performed.

According to this structure, it is possible to produce a smooth change in the motion of an object, thereby preventing an unnatural feeling of stoppage. In other words, the motion of the object is naturalized by not only performing motion interpolation processing at the time the motion of the object changes, but also thereafter. By gradually decreasing the number of times the motion interpolation processing is performed, the effectiveness thereof can be furthered more advantageously. The change in motion patterns of an object is, for example, preferable if it is a change from an "attacking motion" to a "collapsing motion upon being shot."

An image processing device of the present invention for displaying on a screen, upon a first object flying within a virtual three-dimensional space colliding with a second object arranged in the virtual three-dimensional space, a picture showing a change in the position of the second object comprises a storage means for storing coordinate values of the second object, an operation means for operating the moment such second object is subject to upon colliding with the first object and computing the coordinate values of the second object after collision, and an image generating means for renewing the coordinate values of the second object stored in the storage means pursuant to such calculation and generating images of the second object after collision.

Preferably, the image generating means calculates the coordinate values of the second object after collision so as to change the two-dimensional position of the second object seen from a virtual viewpoint. For example, the first object is a bullet and the second object is an enemy character. According to this structure, when the enemy character is attacked, the two-dimensional position of the attacked enemy character will shift when seen from the player's line of sight, thereby increasing the difficulty of shooting the enemy character and enhancing the amusement of the game. As the player will be required to improve his/her shooting techniques, an advanced shooting game is provided thereby.

An image processing device of the present invention for displaying a series of motions of an object comprises a first storage means for storing priorly divided motion patterns of the object as a plurality of motion steps, an image generating means for reading the motion patterns from the storage device and displaying the same on a screen, a detecting means for detecting changes in the motion patterns of the object, a first image controlling means for storing identification information of the motion step in the second storing means upon the detecting means detecting a motion change in the object and controlling the image generating means such that it reads other motion patterns from the first storage means and displays the same on the screen, and a second image controlling means for making the image generating means perform, upon completion of displaying images of the other motion patterns, a motion pattern of a transition of a motion step of said object pursuant to the identification information stored in the second storage means.

For example, the aforementioned object is an "enemy character," the prescribed motion pattern is an "attacking motion," and the other motion pattern is a "collapsing motion upon being shot." According to this structure, the attacked enemy character will return not from the initial motion, but from the condition it was shot, and therefore does not provide an opportunity to the player for shooting. Thus, a player is required to improve his/her skills resulting in the difficulty in the shooting game increasing, thereby enhancing the amusement of the game.

An image processing device of the present invention for displaying on a screen an image of a first object moving within a virtual space seen from a virtual viewpoint of a second object operated by a player comprises a storage means for storing in advance motion patterns of the first object, a means for calculating the distance between the first object and second object and computing a synthetic vector by adding to the speed vector of the first object the vector calculated by multiplying the coefficient corresponding to the distance to the inverse vector of the speed vector of the second object, and an image generating means for reading transition patterns from the storage means and generating images of the speed vector of the first object as the synthetic vector.

Preferably, the aforementioned coefficient is a coefficient having an inverse proportion to the distance. Further, the first object is a bullet. Accordingly, as it is a structure wherein the speed of the first object seen from the second object is either added or subtracted in correspondence to the distance between the first object and the second object, it is possible to represent naturally the flight locus of the bullet in a game since the speed vector of the second object is uninfluenced when the bullet (first object) is in a position far from the second object, and the movement of the bullet is effectively controlled when the bullet is at a distance near the second object.

An image processing device of the present invention for judging the collision between a first object moving within a virtual space and a second object arranged within the virtual space comprises a storage means for storing, upon the virtual space being partitioned per unit grid pursuant to three-dimensional coordinates, the second object existing within the unit grid in correspondence with each unit grid, and a collision judgment means for performing a step of judging the unit grid in which the first object exists and a step of judging the collision between the second object in the unit grid in which the first object exists and the first object.

Preferably, the collision judgment means models the first object as line segment polygons, models the second object as planar polygons, and thereby performs collision judgment according to the intersection of such line segment and plane. Further, the collision judgment means sets a virtual three-dimensional space around the perimeter of the second object and performs the collision judgment by dividing the three-dimensional space into unit grids. The first object is a "bullet." According to this structure, upon the collision judgment between the bullet and other objects, an effective collision judgment can be made without having to perform collision judgment with respect to all other objects existing within the virtual space. That is, accelerated implementation of collision judgment is possible as collision judgment need only be performed regarding the object existing in the unit grid in which the bullet exists. Regarding the unit grid in which the bullet exists, the length of the line segment polygons representing the bullet need only be divided by the length of each of the three axis directions of the unit grid. Thus, the calculation is simple, and the burden of the calculation processing is minimized. Moreover, the length of each of the axis directions of the unit grids may be suitably set in relation to the number and size, etc. of polygons and within the virtual space.

An image processing device of the present invention for displaying on a screen an object representing the movement of the surface of a flowing body comprises a storage means for storing in advance changing patterns representing changes in the surface of the flowing body, and an image generating means for forming the object as an aggregate of polygons along a prescribed direction of the flowing body and generating images of the object by reading the changing patterns from the storage means and changing the length of the polygons along the prescribed direction. Preferably, the movement of the flowing body is a "wave movement." According to this structure, it is possible to represent realistic movements of a wave in comparison to the conventional art. This is especially advantageous in representing images of three-dimensional waves.

An image processing device of the present invention for executing games having a plurality of stages, wherein the first stage and final stage are predetermined, and the intermediate stages may be suitably selected in correspondence with the player's game progress. According to this structure, as the player is able to suitably select the intermediate stages, the amusement in the game is enhanced.

Here, ". . . means" in this specification is a concept realized during image processing, and does not necessarily correspond one-on-one to a particular hardware or software. Identical hardware elements may realize a plurality of ". . . means" or a plurality of hardware elements may realize a single ". . . means." In other words, these ". . . means" are realized by programs stored in memory or other information recording medium within a computer. The information recording medium according to the present invention stores a program capable of making a computer function as the image processing device of the present invention.

A vibration generating device according to the present invention comprises a storage unit for storing vibration waveform data registered upon being associated in advance to each object, and a controlling unit for reading vibration waveform data associated with the object when a prescribed event occurs to the object and generating vibrations by outputting such data to the vibration generating device. Particularly, it is preferable that the vibration generating device is a low frequency sound vibration device. According to the present invention, the vibration generation circuit pursuant to explosions and the like of objects is a separate circuit from the sound signals such as for background music, thereby realizing suitable sound effects in correspondence to the scenes.

BRIEF DESCRIPTION OF THE DRAWINGS

FIG. 5 including FIGS. 5A–5C is a diagram explaining the structure of the explosion object;

FIG. 6 including

FIG. 7 including

FIG. 8 including FIGS. 8A–8B is an explanatory diagram of motion interpolation processing;

FIG. 9 including

FIG. 10 including

FIG. 11 including

FIG. 12 including

FIG. 14 including

FIG. 15 including

FIG. 16 including

FIG. 17 including

FIG. 19 including

FIGS. 23A–23B is a front view and planar view of the game device of the present invention;

DESCRIPTION OF THE PREFERRED EMBODIMENTS

The embodiments of the present invention are now explained with reference to the relevant drawings. The image processing device (game device) of the present embodiment relates to a shooting game. In this shooting game, scores are competed for by a player-operated player character flying freely within a virtual three-dimensional space upon riding a flying machine, and attacking enemy characters (target object) with a machine gun mounted on the flying machine in accordance with the player's operations.

Structure of the Game Device

Figure 1:
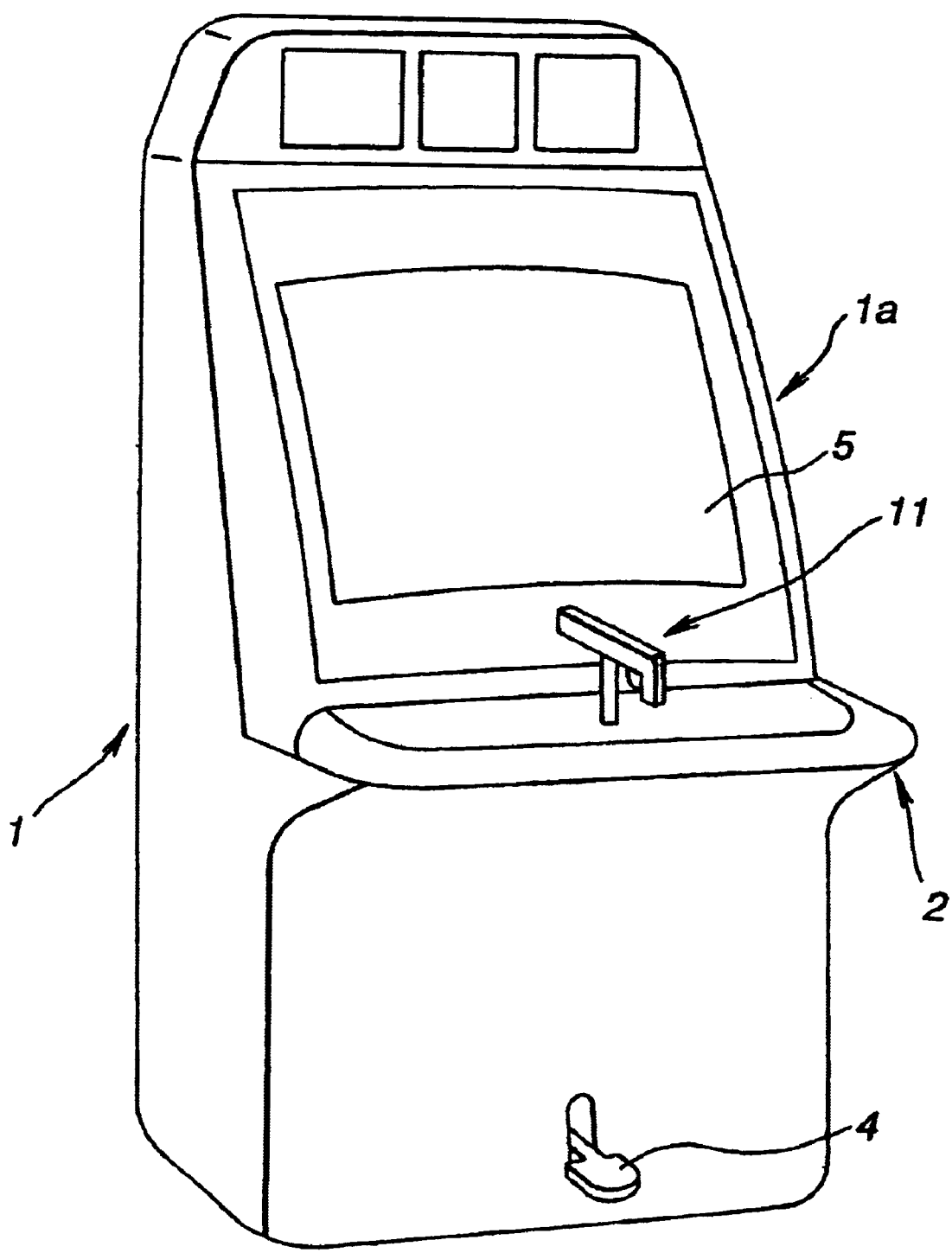
FIG. 1 is an overall perspective view of the game device.

FIG. 1 shows the external appearance of the game device. In this diagram, a game device main body 1 is shown. This box-shaped game device main body 1 has a display 1a provided on the front face thereof. Speaker mounting holes are provided on both sides of the display 1a and speakers 14 (not shown) are mounted thereon.

An operation panel 2 is provided on the front face of the lower part of the display 1a, and a gun unit 11 is provided on this operation panel 2. This gun unit 11 has a trigger and is operated by the player.

A game processing board is provided inside the game device main body 1. The display 1a, gun unit 11 of the operation panel 2, and speakers are connected to the game processing board. By this, the player is able to enjoy a gun shooting game by watching the display 1a and using the gun unit 11 of the operation panel 2.

Figure 2:
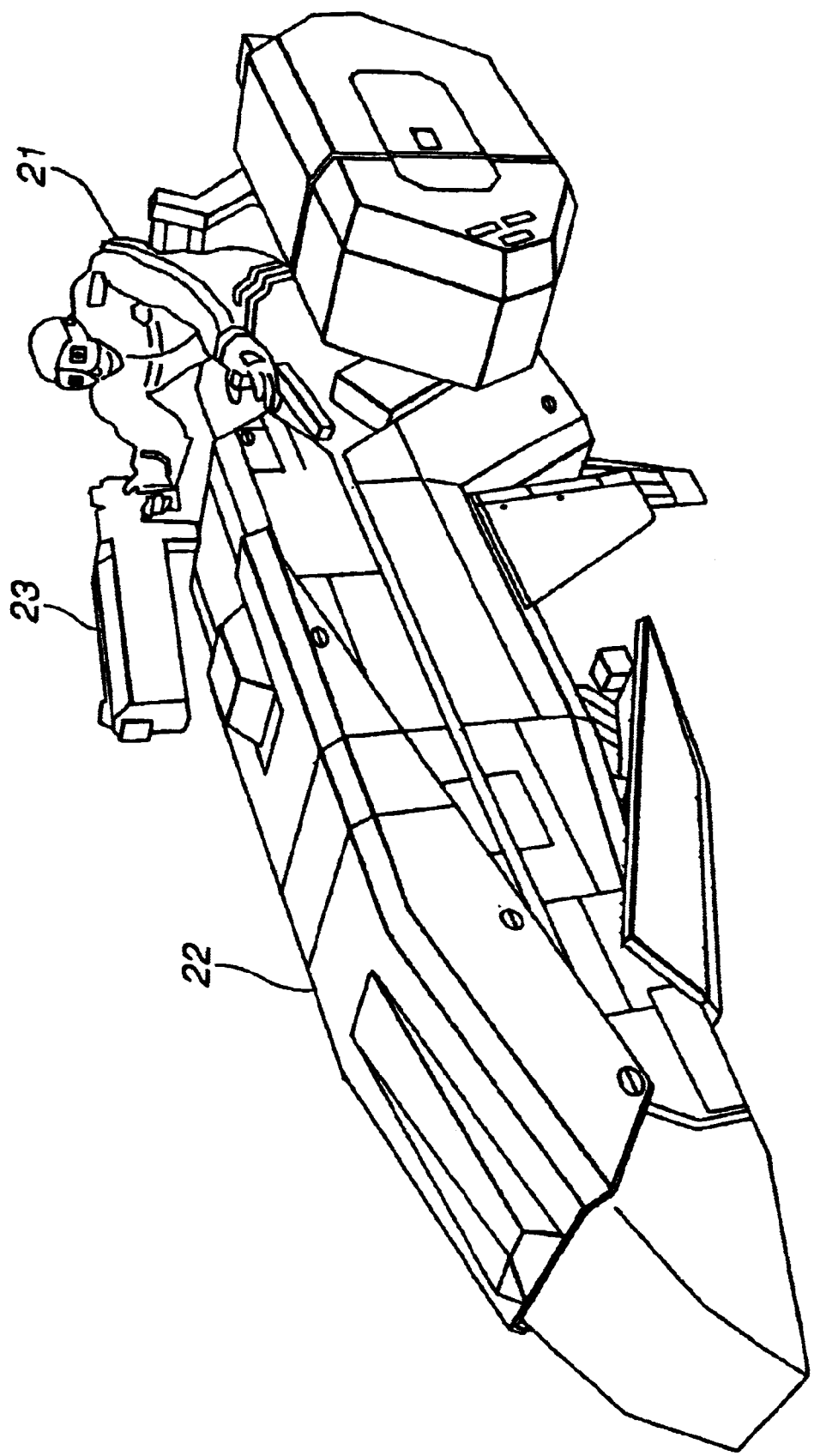
FIG. 2 is a diagram of a flying machine and a player character riding such flying machine.

FIG. 2 is an overall diagram of a flying machine 22 and a player character 21 riding such flying machine. The flying machine 22 is equipped with a machinegun 23 which, upon the operations of the player character 21, successively fires bullets and attacks the enemy character. Enemy characters ride flying devices such as air bikes and rocket belts and fly freely in a city (within a virtual three-dimensional space). The player character is a member of an antiterrorist squad and is ordered to exterminate the enemy characters destroying the city. The machinegun 23 may be an automatic machinegun with unlimited supply of ammunition.

Figure 3:
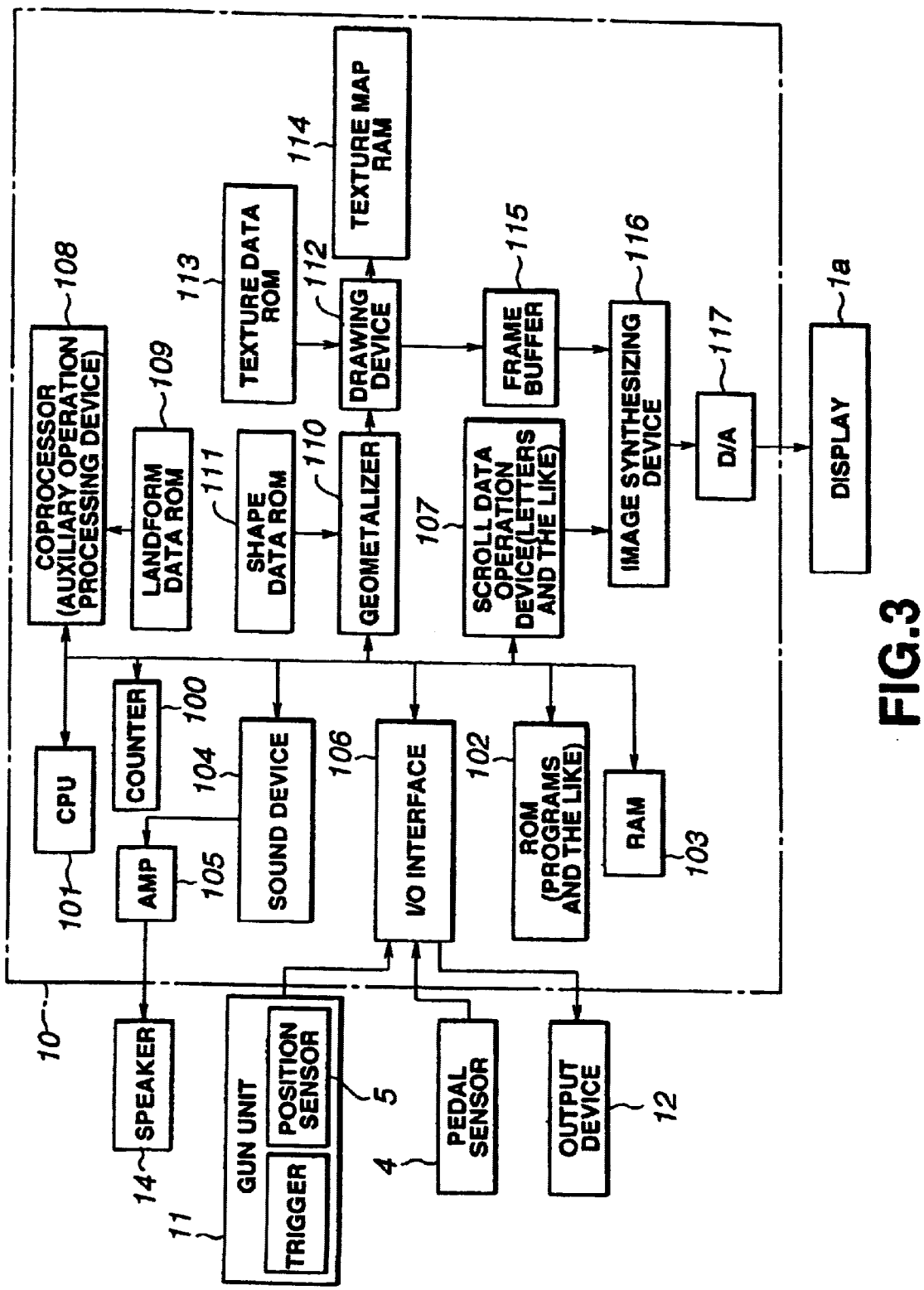
FIG. 3 is a block diagram of the game device.

FIG. 3 is a block diagram of the game device pertaining to the present embodiment. This game device, in short, comprises a display 1a, gun unit 11, game processing board 10, output device 12, and speakers 14.

The game processing board comprises a counter 100, CPU (central processing unit) 101, ROM 102, RAM 103, sound device 104, I/O interface 106, scroll data operation device 107, coprocessor (auxiliary operation processing device) 108, landform data ROM 109, geometalizer 110, shape data ROM 111, drawing device 112, texture data ROM 113, texture map RAM 114, frame buffer 115, image synthesis device 116, and D/A converter 117.

The CPU 101 is connected, via a bus line, to the ROM 102 storing prescribed programs and image processing programs, RAM 103 storing data, sound device 104, I/O interface 106, scroll data operation device 107, coprocessor 108, and geometalizer 110. The RAM 103 functions as a buffer, and performs writing of various commands (display of object, etc.) to the geometalizer and writing of necessary data upon performing various operations.

The I/O interface 106 is connected to the trigger of the gun unit 11, position sensor, and pedal sensor 4. Operation signals from the trigger of the gun unit 11, position sensor, and pedal sensor 4 are read by the CPU 101 as digital data. The CPU performs image processing pursuant to these operation signals upon receiving the input of trigger signals from the gun unit 11, the CPU 101 provides vibration to the output device 12 via the I/O interface 106. This output device is, for example, composed of a sound vibration device such as a base shaker (explained in detail below), and provides vibration near the player's feet. The player is able to enjoy a realistic shooting game due to this vibration. The sound device 104 is connected to the speakers 14 via a power amplifier 105, and the sound signals generated at the sound device 104 are provided to the speakers after being power amplified.

The CPU 101 performs action calculation (simulation) and special effects calculation upon reading operation signals from the gun unit 11 pursuant to a program built in the ROM 102, landform data from the landform data ROM 109, and motion data from the shape data ROM 111 (three-dimensional data, for example, "characters such as enemy characters and the player character" and "backgrounds such as landforms, skies, roads, skyscrapers, and various buildings").

Action calculation is for simulating the movement of characters in a virtual space. After the coordinate values in the three-dimensional virtual space are determined, conversion matrix for converting these coordinate values to a visual field coordinate system, and polygon data are designated by the geometalizer 110. The landform data ROM 109 is connected to the coprocessor 108, and predetermined landform data is delivered to the coprocessor 108 (and the CPU 101). The coprocessor 108 mainly handles the operation of floating points. Consequently, the coprocessor 108 performs various judgments and, as such judgment results are provided to the CPU 101, the calculation burden of the CPU is reduced.

The geometalizer 110 is connected to the shape data ROM 111 and the drawing device 112. As mentioned above, shape data (three-dimensional data such as characters, landforms, and backgrounds made from each of the apexes) formed of a plurality of polygons is stored in the shape data ROM 111 in advance, and this shape data is delivered to the geometalizer 110. By performing perspective conversion to the shape data designated by the conversion matrix sent from the CPU 101, the geometalizer 110 obtains data converted from the coordinate system in the three-dimensional space to a visual field coordinate system.

The drawing device 112 affixes textures to the converted shape data of the visual field coordinate system and outputs the result to the frame buffer 115. Due to the affixation of these textures, the drawing device 112 is connected to the texture data ROM 113 and the texture map RAM 114, as well as to the frame buffer 115. Here, polygon data shall mean a relative or absolute data group of each apex of a polygon (mainly a triangle or quadrilateral) formed of an aggregate of a plurality of apexes.

Stored in the landform data ROM 109 is polygon data set comparatively rough, sufficient for performing prescribed judgments. On the other hand, stored in the shape data ROM 111 is polygon data set more precisely in relation to the shape structuring displays such as enemies and backgrounds.

The scroll data operation device 107 is for operating scroll screen data of letters and the like (stored in the ROM 102). This operation device 107 and the frame buffer 115 result in the display 1a via the image synthesizing device 116 and the D/A converter 117. By this, polygon screens (simulation results) such as enemies and landforms (backgrounds) temporarily stored in the frame buffer 115 and scroll screens of necessary letter information are synthesized according to the designated priority, and a final frame image data is generated. This image data is converted into analog signals at the D/A converter 117 and sent to the display 1*a*, and the game image is displayed in real time.

The shooting game program in the present embodiment may be configured such that it performs the game by reading such program from a prescribed recording medium. Here, an information recording medium is any form of physical means having recorded thereon information (a game program for example) in the recording area of such medium, and includes a CD-R, game cartridge, floppy disc, magnetic tape, optical magnetic disc, CD-ROM, DVD-ROM, DVD-RAM, ROM cartridge, RAM memory cartridge w/battery backup, flash memory cartridge, nonvolatile RAM cartridge, and so on.

This also includes communication mediums of wire communication mediums such as telephone circuits and radio communication mediums such as microwave circuits. The Internet is also included in the communication medium mentioned above.

Image Processing of Explosion Pictures

Figure 4:
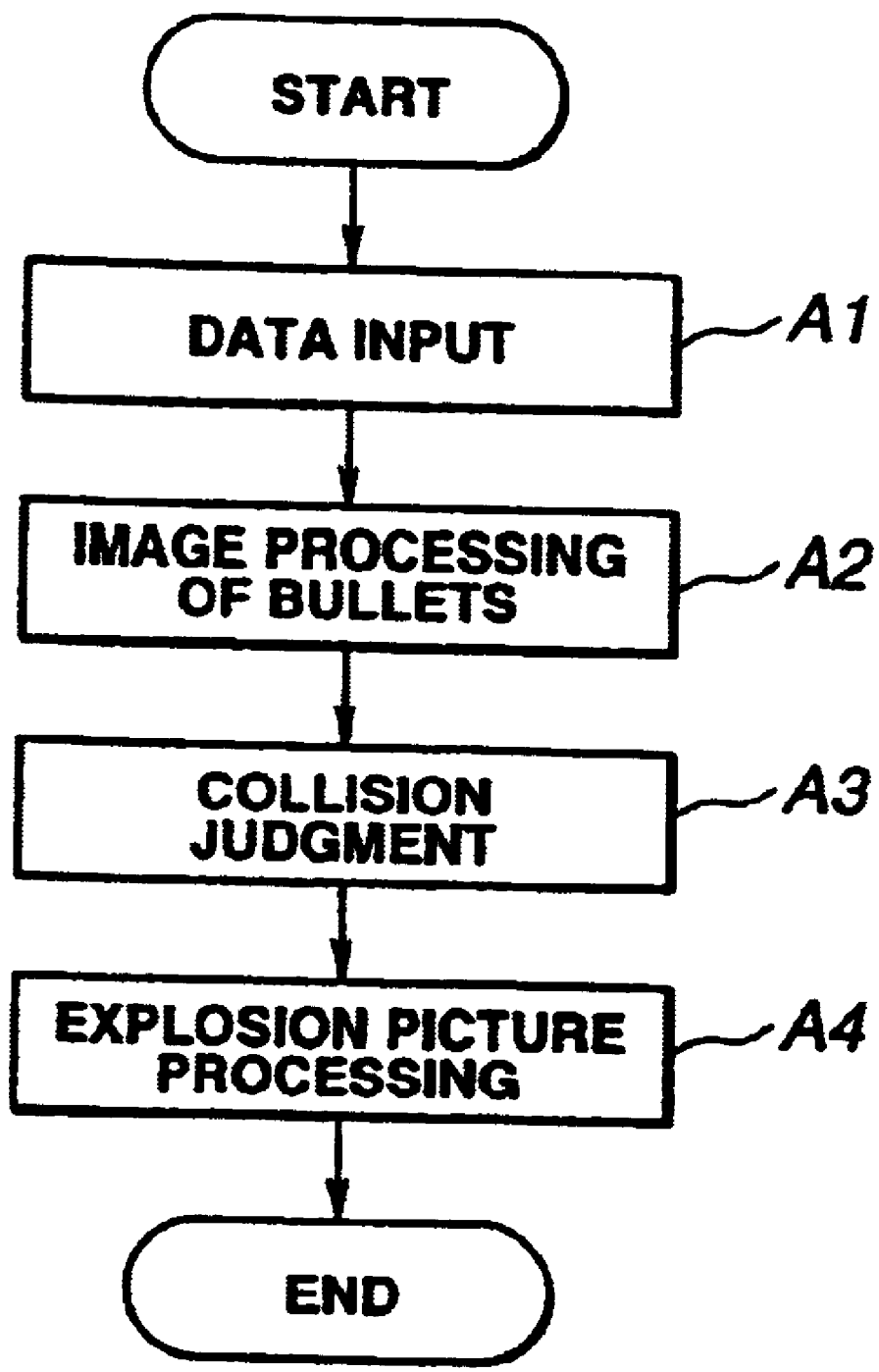
FIG. 4 is a flowchart of the processing steps of an explosion picture.

The image processing steps of explosion pictures of a bullet and the like in shooting games are now explained with reference to FIG. 4. The CPU 101 inputs operation signals of the likes of a gun unit 11 and pedal sensor 4 via the I/O interface 106 (step A1) and displays on the screen a flight condition of a bullet (step A2). In other words, the flight locus of the bullet is calculated in relation to the position, speed, etc. of the player character and the flight condition of the bullet is displayed on the screen in accordance with such locus. Next, the collision judgment is made with respect to the bullet and enemy characters, skyscrapers, bridges, other buildings, roads, etc. arranged within the virtual space (step A3). Collision judgment is the judgment of contact between two objects. Polygons for collision judgment are set for the respective objects, and collision judgment is conducted according to the crossing of these polygons. When a bullet collides with some object, an explosion picture of the bullet is displayed on the screen (step A4).

The image processing of explosion pictures in S404 is realized by combining spherical polygons (or three-dimensionally structured objects for representing explosions) and planar polygons (or two-dimensionally structured objects for representing explosions). This is explained with reference to FIG. 5. In FIG. 5,(A), (B), and (C) respectively represent times $T_1$, $T_2$, and $T_3$ in the explosion picture. In order to realize this explosion picture, loci $P_1$ and $P_2$ of sparks, smoke, flames, and the like are foremost set in consideration of the impact area of the bullet, impact angle of the bullet, speed of the bullet, and so on. Next, spherical polygons and planar polygons are arranged such that the boundaries thereof overlap in the direction of these loci $P_1$ and $P_2$. For example, in time T1, spherical polygon R1, planar polygon S1, spherical polygon R2, and planar polygon R2 are arranged such that they overlap with their respective boundaries. In time $T_2$, spherical polygon R3 is arranged such that it covers the periphery (boundary) of planar polygon S2. Similarly, in time $T_3$, planar polygon S3 is arranged such that it covers the boundary of spherical polygon R3. Therefore, by covering the boundaries of the planar polygons with spherical polygons, it is possible to overcome the unnaturalness of linear boundaries caused by explosion pictures realized only with planar polygons.

Next, explained below is explosion processing of the enemy character hit by a bullet, that is, processing in which a segment (fragment) of the enemy character's body scatters (processing for scattering within a virtual three-dimensional space a section of the polygons structuring the enemy character, which is a target object). Foremost, the CPU refers to the life gauge of the enemy character hit by a bullet. This life gauge displays the remaining energy of the enemy character, and when the life gauge becomes zero, the enemy is defeated. In other words, the enemy character is erased from the virtual three-dimensional space. If the life energy is not zero, the enemy character is still alive. Thus, displayed is a picture of a segment of the enemy character is body (fragment, i.e., a section of the polygons among the group of polygons structuring the enemy character) scattering on the proximal end of the screen. On the other hand, if the life energy is zero, displayed is a picture of a segment of the enemy character's body (fragment) scattering on the distal end of the screen as the enemy character is dead. Accordingly, by changing the scattering direction of the segment (fragment) of the enemy character's body, the player can easily judge whether the enemy character is dead or alive. When shooting enemy characters with machine-guns and the like in conventional shooting games, it is not possible to judge at what stage the enemy character is defeated as the shooting is conducted continuously. In the present invention, however, the judgment of whether the enemy character is dead or alive can easily be made as the scattering direction of the segment (fragment) of the enemy character's body is changed during the stages of shooting such enemy character. Thus, it is easy to proceed the game.

Further, the scattering direction of the segment (fragment) of the enemy character's body is not limited to the above, and may also be set to the directions of left (when the enemy character is dead) and right (when the enemy character is alive) on the screen seen from the player's line of sight. Moreover, it may be suitably and optionally set to the upward and downward directions, and so on.

Data Structure of the Explosion Object

Figure 6A:
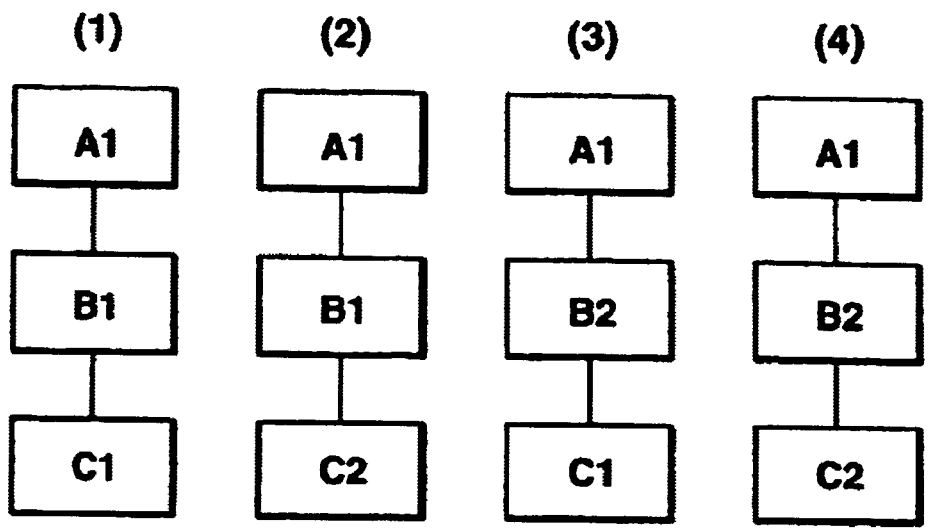
FIGS. 6A–6B is the data structure of the explosion object.
Figure 6B:
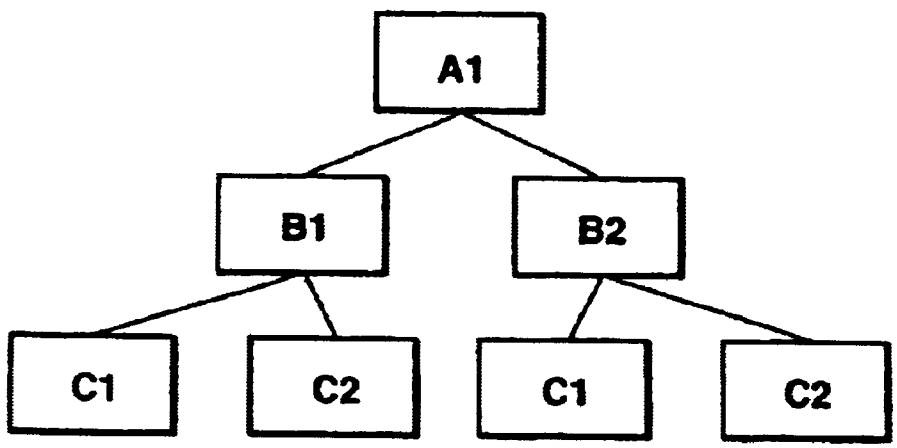
Figure 7A:
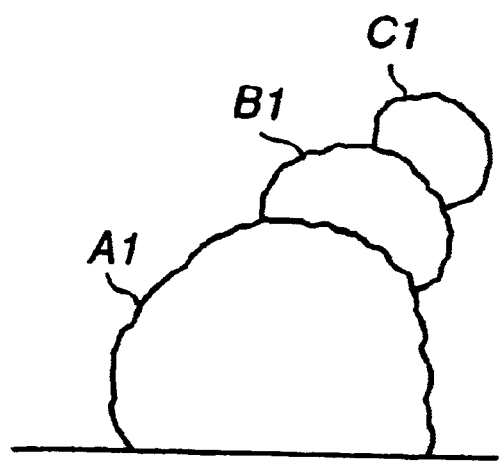
FIGS. 7A–7D is a diagram explaining the structure of the explosion object.
Figure 7C:
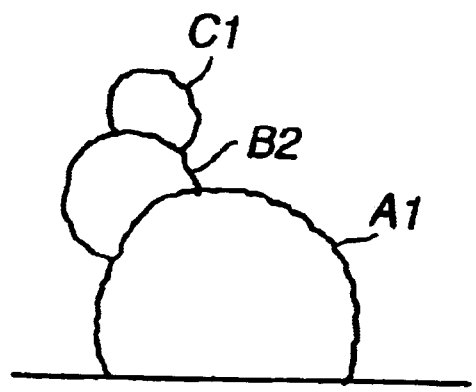
Figure 7B:
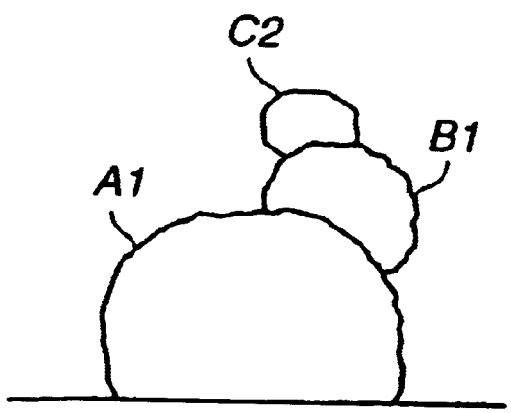
Figure 7D:
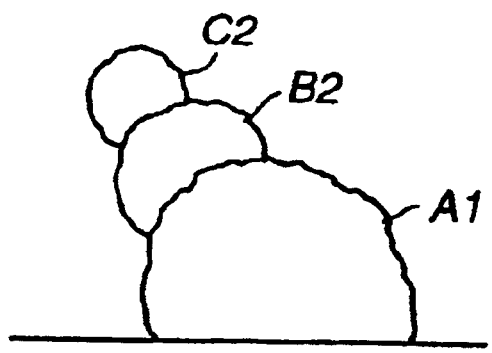
Figure 9A:
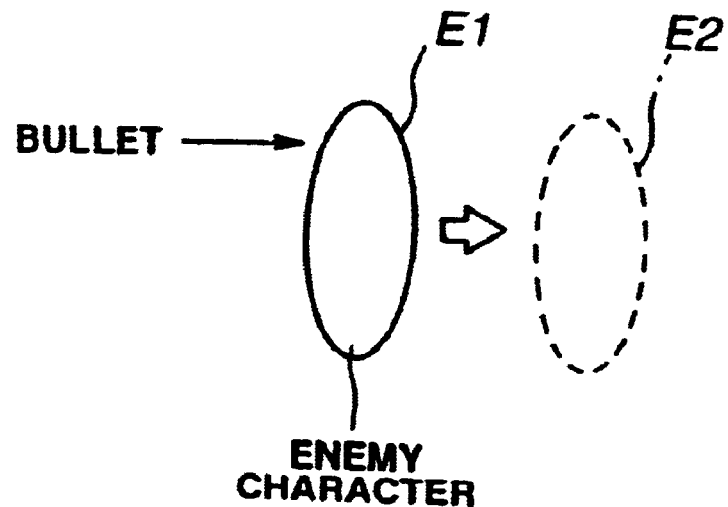
FIGS 9A–9B is an explanatory diagram of enemy character action upon being shot in conventional art.
Figure 9B:
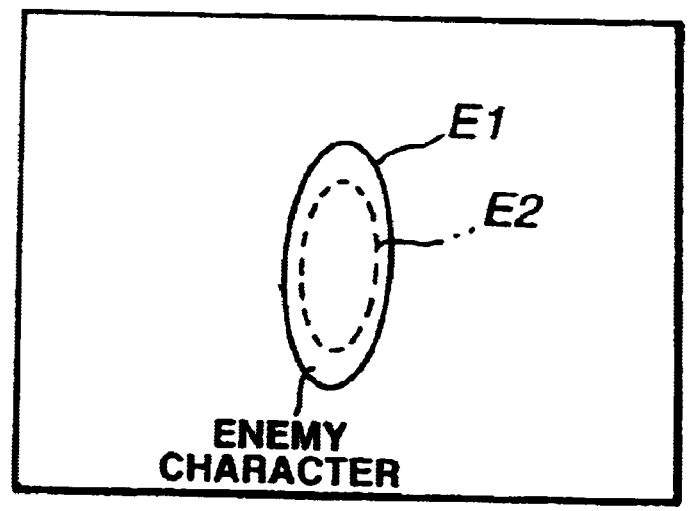

Next, the data structure of explosion objects representing explosions of bullets and the like is explained with reference to FIG. 6. The explosion object is structured of a plurality of data. For example, an explosion object is structured of four combinations of explosion data A1, B1, B2, C1, and C2 (patterns (1) through (4)). In such case, the data structure of the explosion object in the present embodiment is, for example, as shown in FIG. 6(B), structured such that all four data structures A1-B1-C1, A1-B1-C2, A1-B2-C1, and A1-B2-C2 are arranged hierarchically. In other words, explosion data A1 common to all explosion objects is placed at the root, and then, B1 and B2 are arranged on the second layer and C1 and C2 are arranged on the third layer. Then, according to the lapse in time, they are erased in the order arranged.

By this arrangement, it is possible to set to explosion data A1 a pointer for indicating addresses of B1 and B2, and to explosion data B1 and B2 a pointer for indicating addresses of C1 and C2, respectively. According to this data structure, in comparison to conventional art (FIG. 6(A)), it is possible to lessen the memory necessary for storing data of explosion objects.

The present invention may be employed for a data structure of an object other than an explosion object.

Motion Interpolation Processing

Next, motion interpolation processing is explained with reference to FIG. 8(B). Suppose that the enemy character is damaged during the "attacking motion (motion pattern M)." Thereupon, the enemy character makes a transition to a step which successively performs the "collapsing motion (hit pattern H1, H2, . . . )." In other words, in accordance with the results of the collision judgment, the CPU reads the series of motion condition data conducted by the target object and displays this on a screen. At such time, motion interpolation processing C1 is performed for a few frames between the motion pattern M and hit pattern H1. Next, motion interpolation processing C2 is performed for n frames between hit pattern H1 and hit pattern H2. Further, motion interpolation processing C3 is performed n−1 frames between hit pattern H2 and hit pattern H3, and motion interpolation processing C4 is performed n−2 frames between hit pattern H3 and hit pattern H4. Accordingly, by gradually decreasing the number of frames of interpolation (number required to produce interpolation data), slow motion is returned to the normal speed. That is, the speed of slow playback is gradually returned to the normal speed. By this, it is possible to lessen unnatural changes of motion patterns, thereby presenting a realistic shooting game.

If one frame is 1/60 sec, it is preferable that the value of n above is within the range of 1 to 4.

Movement of Enemy Character Upon Being Damaged

Figure 10A:
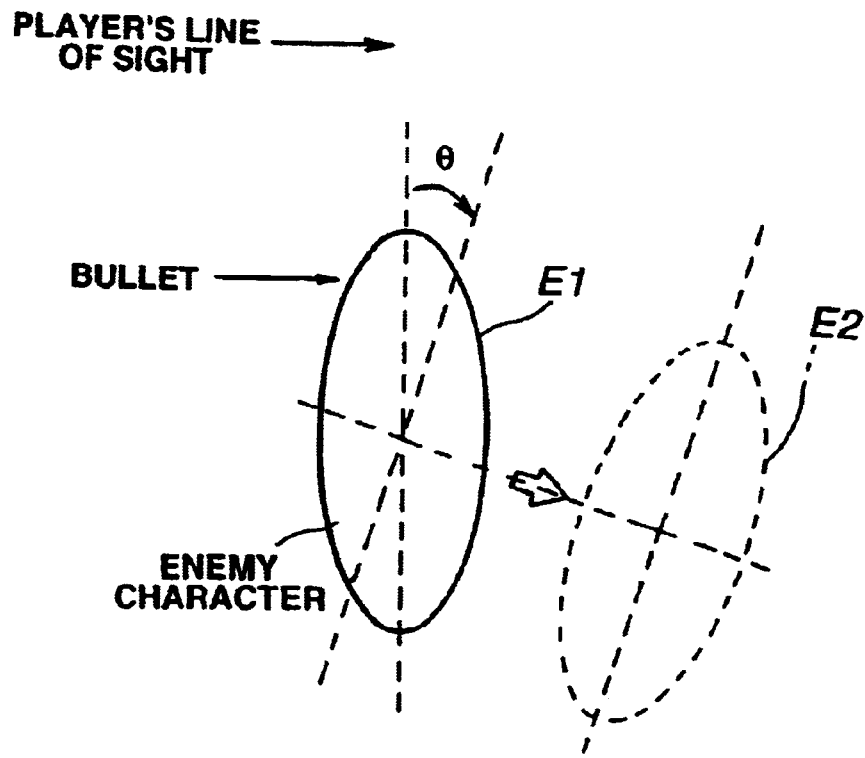
FIGS 10A–10B is an explanatory diagram of enemy character action upon being shot in conventional art.
Figure 10B:
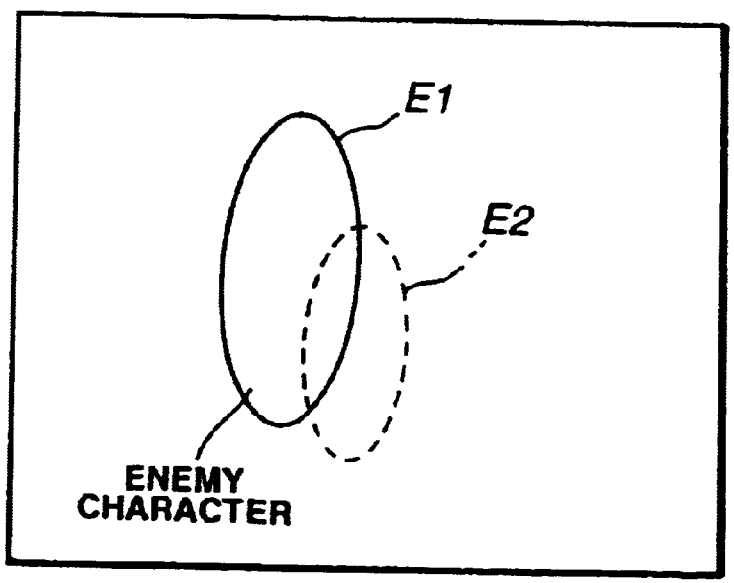

Next, the movement of the enemy character upon being damaged is explained with reference to FIG. 10. This invention relates to the movement and action of the enemy character upon being hit by a bullet. In the present invention, the torque (distance between the centroid of the enemy character and the impact position of the bullet multiplied by the force from the bullet) received by the enemy character upon being hit by a bullet is calculated, and angle θ, the inclination of the enemy character, is computed pursuant to such torque. Then, position E2, after movement, is calculated from position E1 of the enemy character upon being hit by a bullet. The movement of the enemy character upon being hit by a bullet seen from the player's line of sight is as shown in FIG. 10(B). Therefore, the position change of an enemy character (model) upon being hit by a bullet, when seen from a player's line of sight, results in a two-dimensional position shift (position change of a character is in a direction other than the direction of line of sight from the virtual viewpoint). Thus, taking aim with a machinegun becomes difficult, thereby necessitating the improvement of one's skill. In other words, heretofore, as enemy characters being hit by a bullet only showed two-dimensional position changes when seen from the player's line of sight, continuous hits with bullets were possible. On the other hand, the present embodiment prevents such easy continuous hits.

Half-cancel of Motions

Figure 11A:
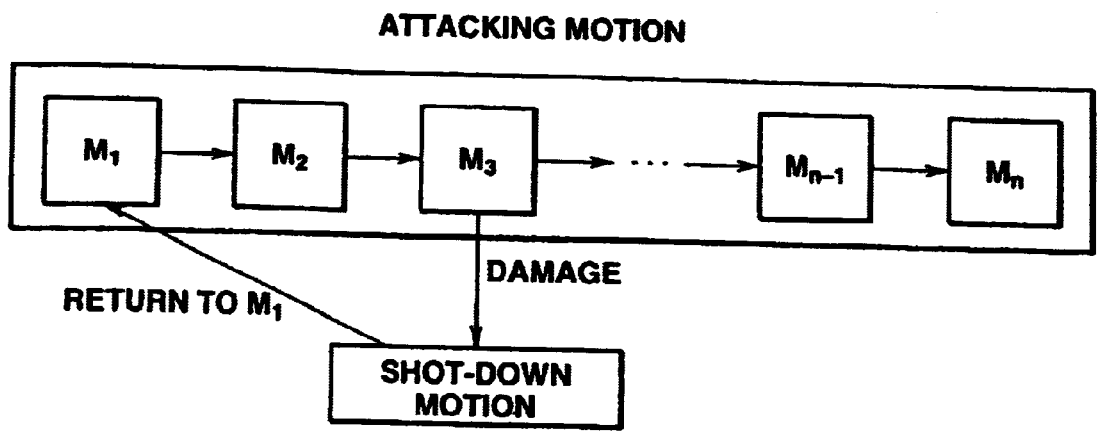
FIGS. 11A–11B is an explanatory diagram of a motion being half cancelled.
Figure 11B:
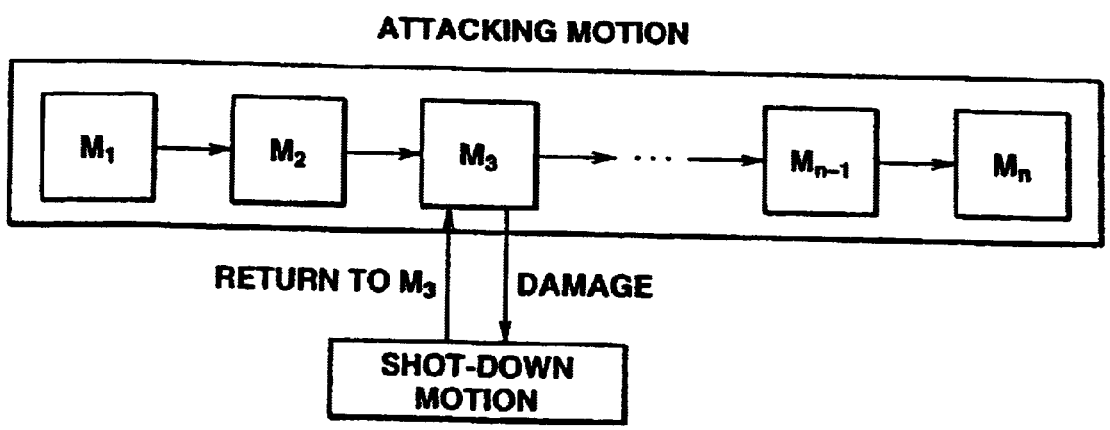

Next, the half-cancel of motions is explained. Half-cancel of motions is, upon making a transition to another motion pattern (2) during the performance of a motion pattern (1) made from a plurality of motion steps, storing the motion step M at such time and performing motion pattern (1) from such motion step M after the completion of motion pattern (2). This point is explained with reference to FIG. 11(B). Here, the enemy character starts the attacking motion and successively performs each of the attacking steps $M_1$, $M_2$, . . . , $M_{n-1}$, $M_n$. Suppose that the enemy character is hit by bullets from a player character and damaged in attacking step $M_3$. Then, the CPU stores the identification information of attacking step M3 in the RAM and makes a transition to the shot-down motion. After the completion of the shot-down motion, the CPU returns once again to the attacking motion from attacking step $M_3$ pursuant to the identification information stored in the aforementioned RAM. According to this structure, as the enemy character immediately makes a transition to an attacking mode upon completion of the shot-down motion, no opportunity is provided to the player for attacking as in the conventional art. Therefore, the difficulty of the game is prevented from being heedlessly lowered, and the amusement of the game is increased.

Further, when returning to attacking step $M_3$ in the aforementioned example, the setting can be such that the return is made a few frames before or after the shot-down motion.

Moreover, a weak point of an enemy character can be set. In such case, a half-cancel of motions is performed upon returning from the shot-down motion if the bullet hits this weak point, or, if the bullet hits any other point other than this weak point, the attacking is continued without a transition to the shot-down motion. When set like the above, the amusement of the game increases because in order for the player to progress the game advantageously, such player is required to aim at the weak point of the enemy character.

Method of Controlling Flight Locus of Bullet

Figure 12A:
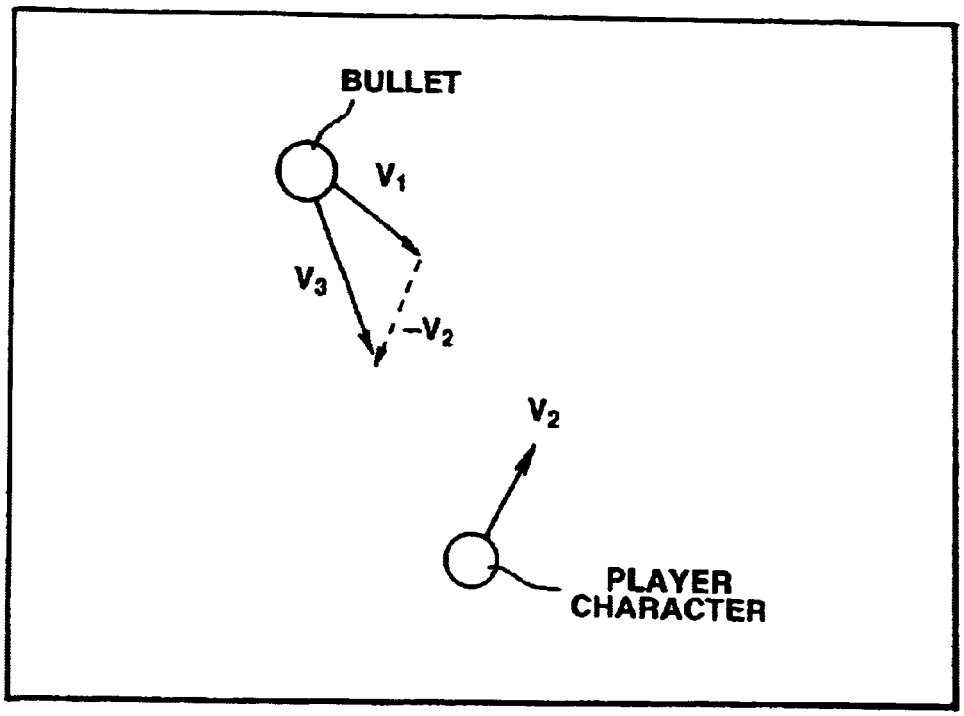
FIGS. 12A–12B is an explanatory diagram of the flight locus of a bullet seen from the player's line of sight.
Figure 12B:
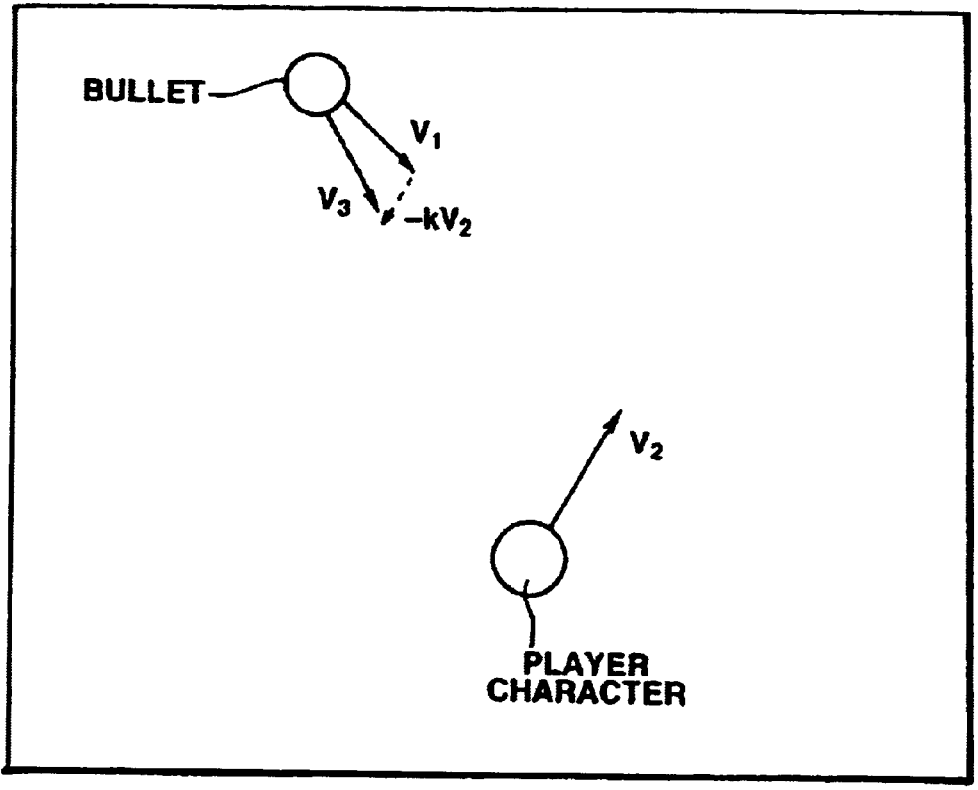
Figure 13:
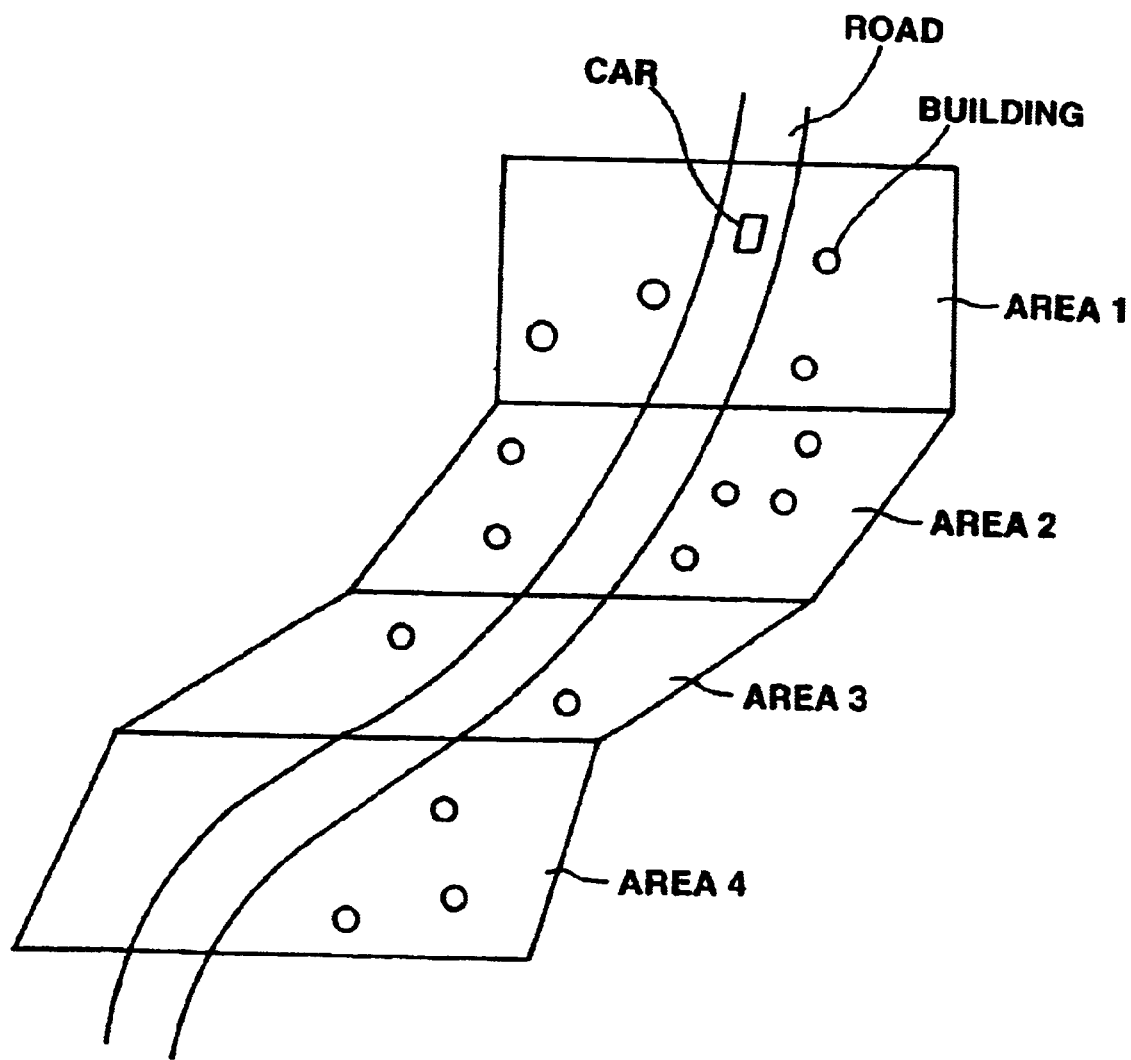
FIG. 13 is an explanatory diagram of collision judgment in conventional art.
Figure 14A:
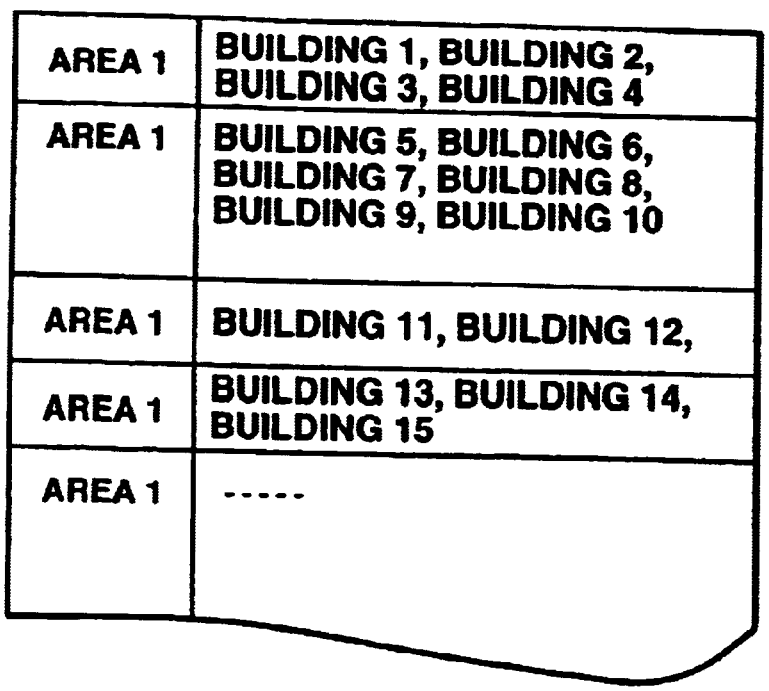
FIGS. 14A–14B is an explanatory diagram of collision judgment in conventional art.
Figure 14B:
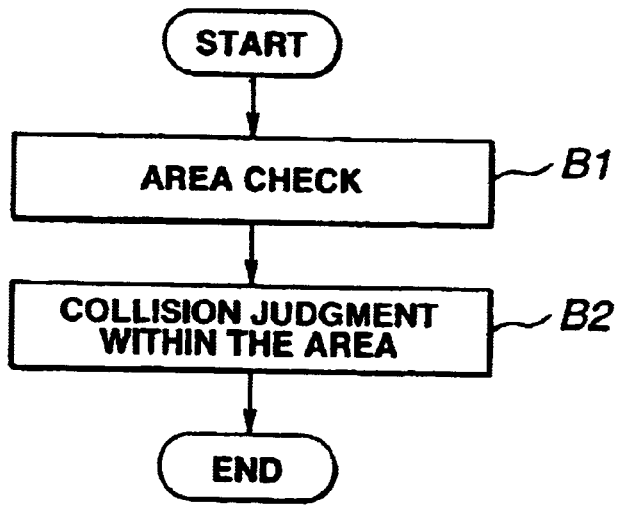

Next, the method of controlling the flight locus of a bullet is explained with reference to FIG. 12. The method of the present invention for controlling the light locus of a bullet, for example, controls the flight locus of a bullet seen from the player's viewpoint pursuant to the distance between the bullet and the player character. If FIG. 12(B), suppose that the bullet is flying at speed $V_1$ and the player character is moving at speed $V_2$. The CPU obtains the distance between the bullet and the player character from the coordinates thereof. Then, in order to obtain the flight locus of the bullet seen from the player's viewpoint, a synthetic vector $V_3=V_1-kV_1$ is obtained by multiplying to speed $V_2$ the coefficient k which is inversely proportioned to the aforementioned distance. This synthetic vector $V_3$ is the speed vector of the bullet seen from the player's viewpoint.

According to this structure, the speed $V_2$ of the player character hardly influences the flight locus of the bullet when the distance between the bullet and player character is far. On the other hand, if such distance between the two is near, the speed of the bullet is adjusted in accordance with the speed $V_2$ of the player character. Thus, problems as with the conventional art do not arise.

Acceleration of Collision Judgment

Figure 15A:
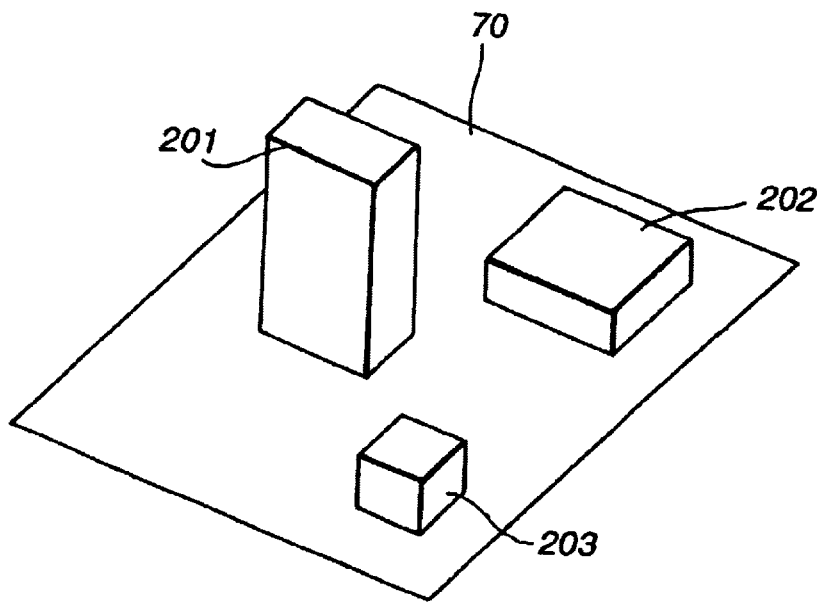
FIGS. 15A–15B is an explanatory diagram of collision judgment in the present invention.
Figure 15B:
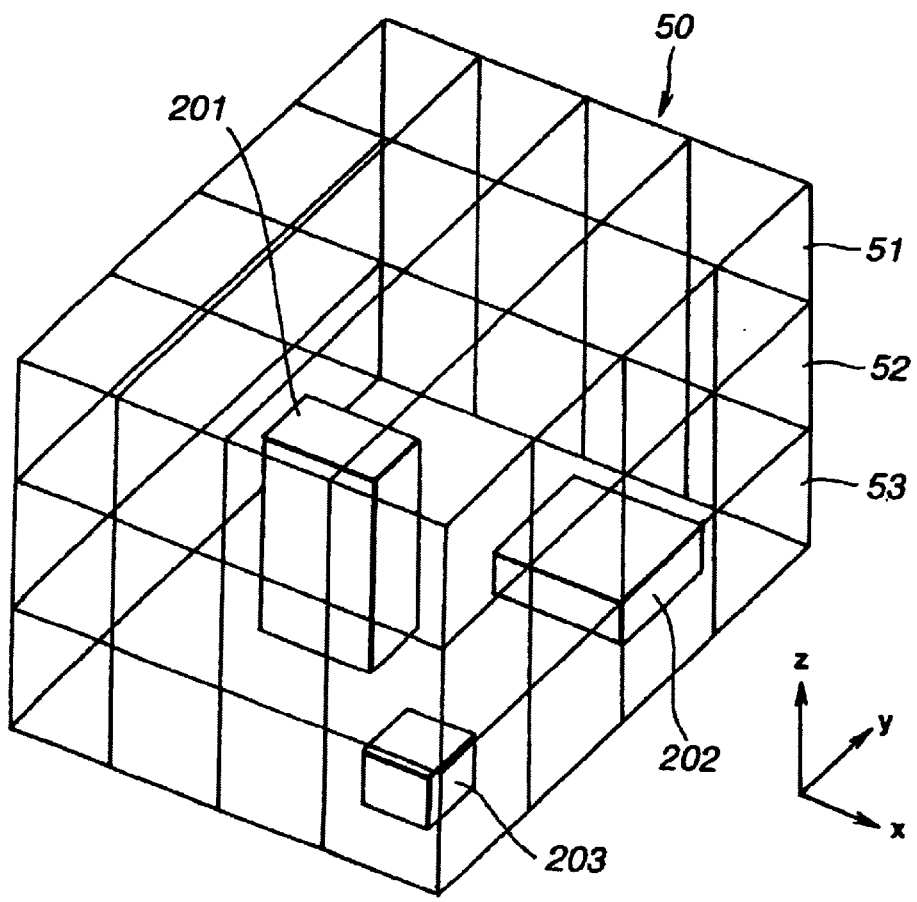
Figure 16A:
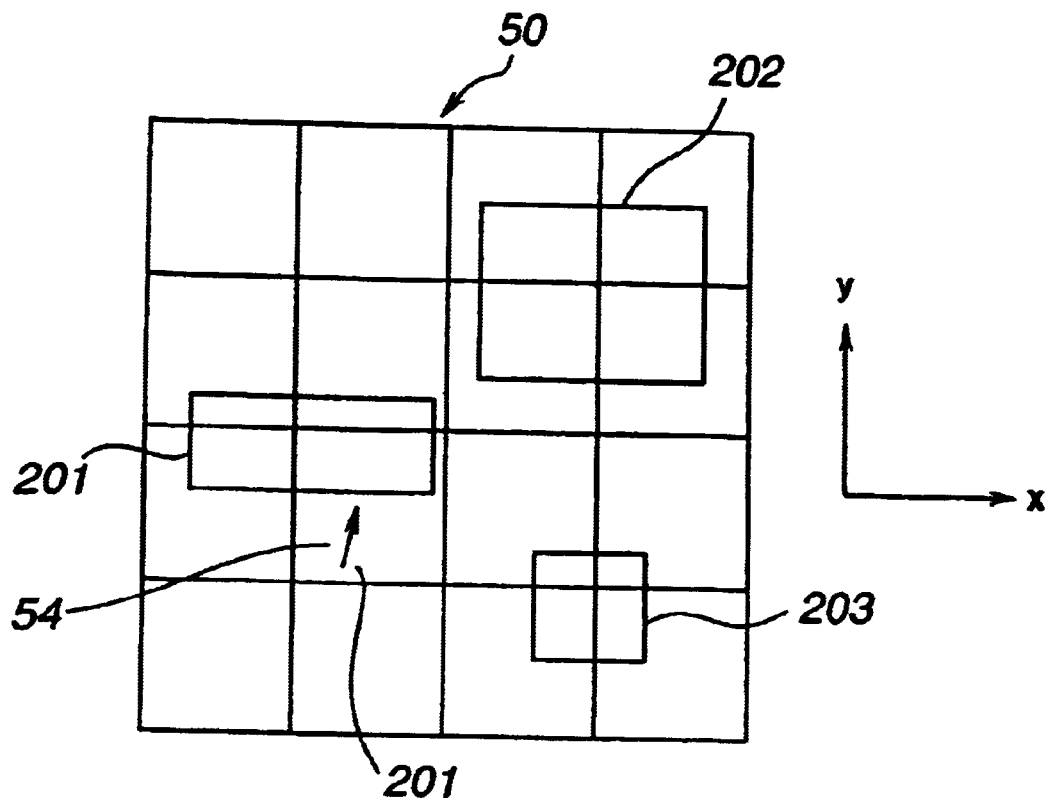
FIGS. 16A–16B is an explanatory diagram of collision judgment in the present invention.
Figure 16B:
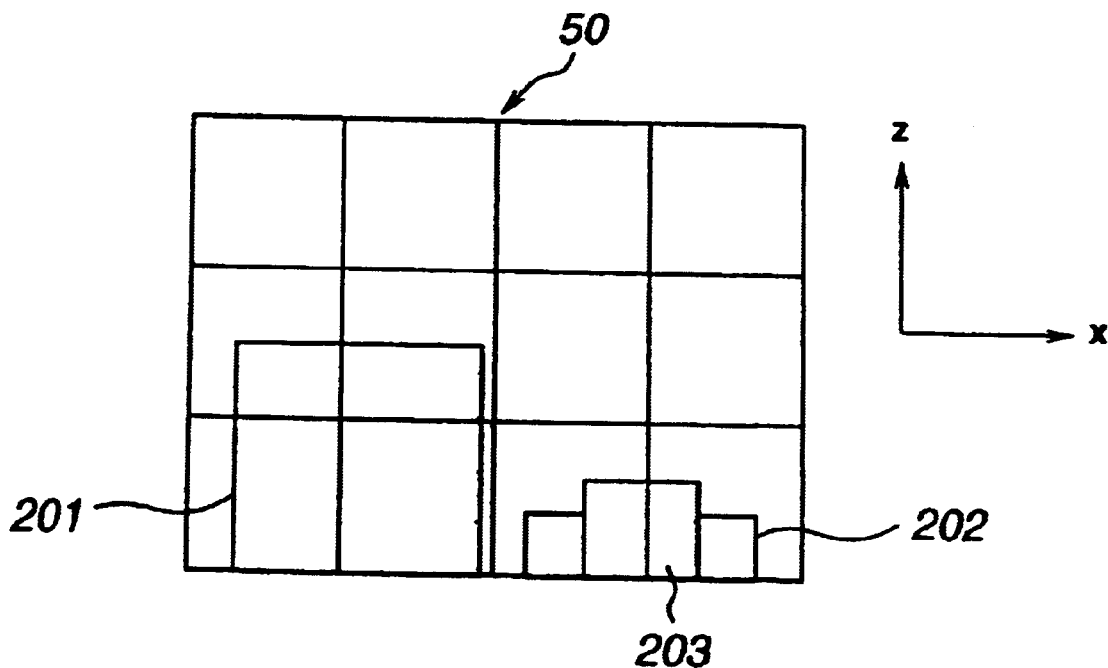

Next, the acceleration of collision judgment is explained. In order to realize the acceleration of collision judgment, the present invention divides the game screen, that is, the overall virtual space, into grids. Then, the unit grid in which an object subject to collision judgment exists is searched, and collision judgment with respect to all objects existing in such unit grid is performed. This is explained with reference to FIG. 15. FIG. 15(A) is a picture of a city, in a simplified and modeled form, realized on the virtual space 70. Objects, such as buildings 201, 202 and 203 are shown therein. FIG. 15(B) sets a prescribed three-dimensional area 50 within the virtual space and divides this three-dimensional area 50 into unit grids 51, 52, 53, and so on. For example, suppose the respective lengths of directions x, y and z of these unit grids is 1. FIG. 16(A) is a diagram projected on plane xy, and FIG. 16(B) is a diagram projected on plane xz.

Figure 17A:
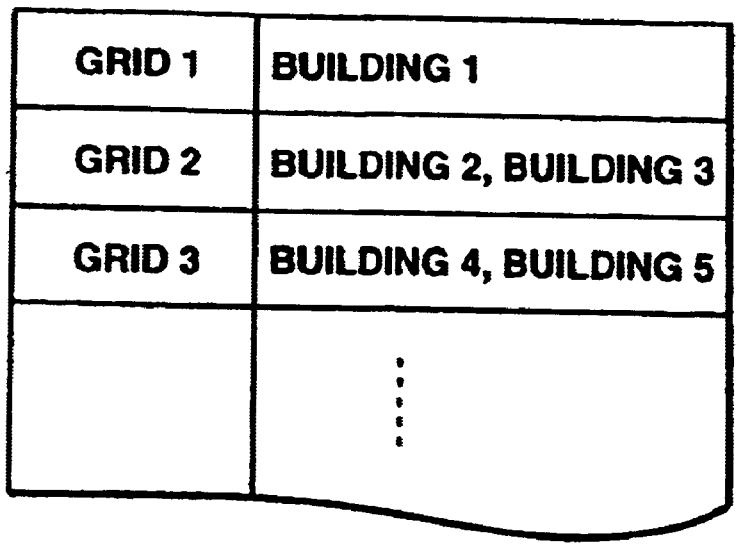
FIGS. 17A–17B is an explanatory diagram of collision judgment in the present invention.
Figure 17B:
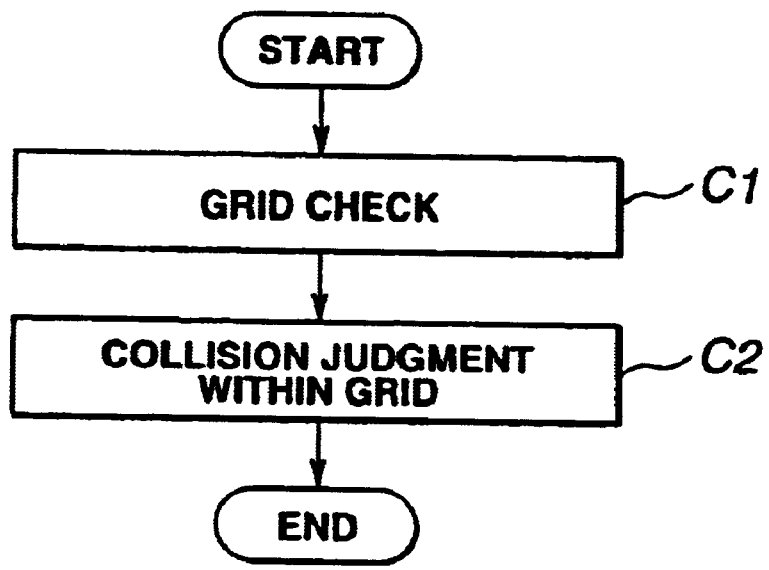

Collision judgment, for example, is performed on the likes of bullet and building, moving character and wall, in other words, a moving object and an object with a fixed position on the virtual space (or, polygons forming the object or polygons to be used for the collision judgment of such object). In this case, the moving object is represented in vectors (line segment holding size and direction) and collision judgment is performed with another object (object with a fixed position on the virtual space and an object other than the aforementioned moving object). Steps of collision judgment are explained with reference to FIG. 17. As shown in FIG. 17(A), objects such as buildings existing in each of the unit grids are made into a list. Collision judgment is performed in accordance with the steps shown in FIG. 17(B). First, an object for collision judgment, for example, the unit grid in which the bullet is existing, is searched (step C1). This step models the bullet as a vector and checks in which unit grid the coordinates of the starting and terminating points of the vector exist. Next, if a unit grid with a bullet exists, it then performs collision judgment with the polygons forming the object existing in such unit grid (step C2). For example, as shown in FIG. 16(A), the bullet moving within the virtual space is represented by a vector 40, and if this vector 40 exists in the unit grid 54, collision judgment with the polygons forming the object 201 existing in this unit grid 54 is performed. As this will allow the decrease in polygon numbers in which collision judgment is to be performed, acceleration of processing is possible.

Figure 18:
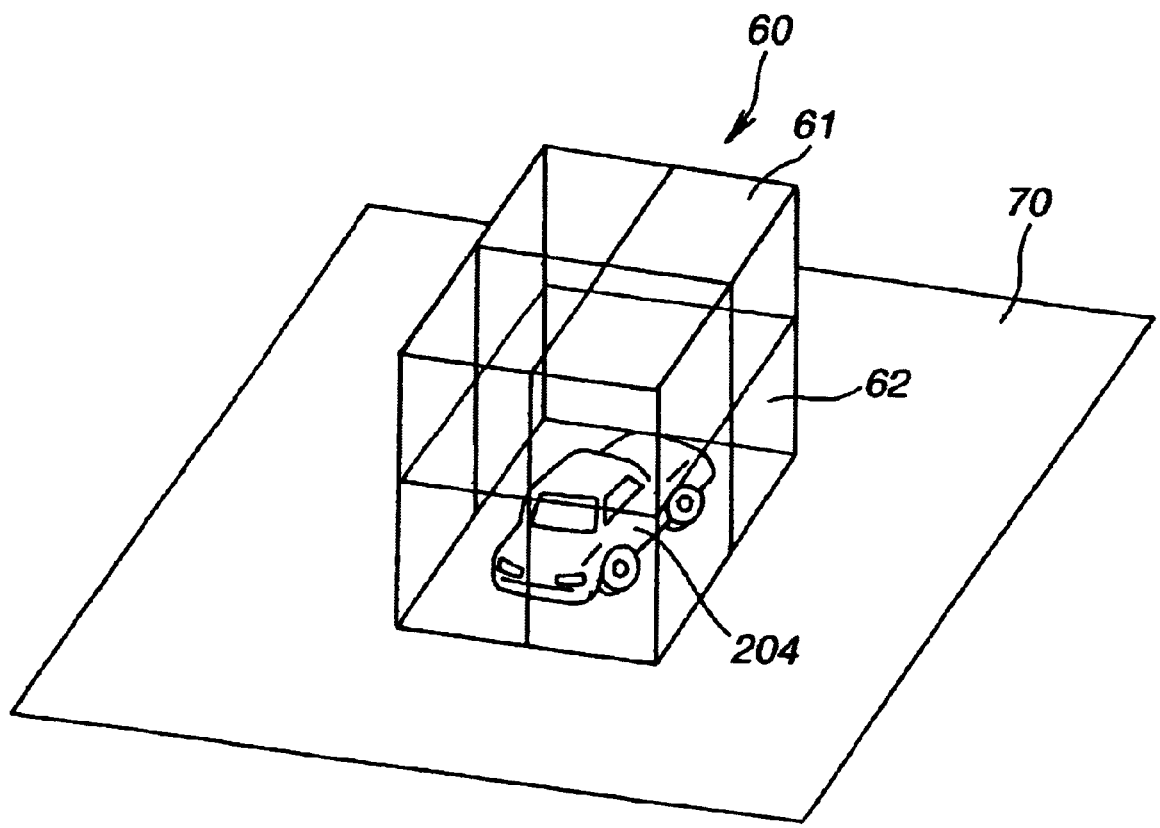
FIG. 18 is an explanatory diagram of collision judgment in the present invention.

Further, it is also possible to perform collision judgment by setting a three-dimensional area around the periphery of an optional object arranged within the virtual space and dividing this three-dimensional area into unit grids. For example, as shown in FIG. 18, a three-dimensional area 60 is set around the periphery of the automobile 204 moving on the virtual space 70, and this three-dimensional area 60 is divided into unit grids 61, 62, and so on. According to this structure, it is possible to decrease the number of polygons in which collision judgment is to be performed. Moreover, it is possible to perform collision judgment more precisely and more accurately.

Thus, according to the present embodiment, since it is not necessary to perform collision judgment with every object existing within the virtual space and all polygons forming the object, the amount of calculation is decreased, and the processing speed is greatly accelerated. In addition, since the position of the vector can be easily determined by comparison of coordinates, collision judgment need only be performed with the vectors positioned within the three-dimensional space, and the calculation amount is reduced. Further, the number of unit grids can be suitably set to an adequate number such that the calculation amount is reduced in consideration of the size, quantity, position, density, etc. of the object arranged within the virtual space.

Representation of Waves

Next, the method of representing waves according to the present embodiment is explained with reference to FIG. 18. In the present embodiment, polygons representing the waves are, as shown in FIG. 18(A), formed of a gathering of numerous rectangular polygons $P_1$, $P_2$, $P_3$, and so on in which the lengthwise direction thereof is the direction of the wave's depth. And, by changing the respective heights $h_1$, $h_2$, $h_3$, . . . , of rectangular polygons $P_1$, $P_2$, $P_3$, . . . , in accordance with predetermined steps, the movement of waves may be represented. FIG. 18(A), (B), and (C) respectively correspond to time $T_1$, $T_2$, and $T_3$. Heights of rectangular polygons $P_1$, $P_2$, $P_3$, . . . , for example, are changed as a simple harmonic motion movement such that wave frequencies are represented as simple harmonic motions.

Configuration of Game Stages

Figure 19A:
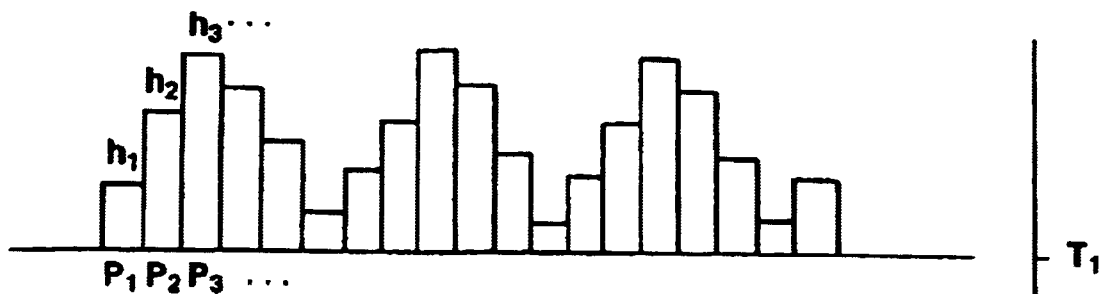
FIGS. 19A–19C is an explanatory diagram of the structure of an object representing a wave motion.
Figure 19B:
Figure 19C:
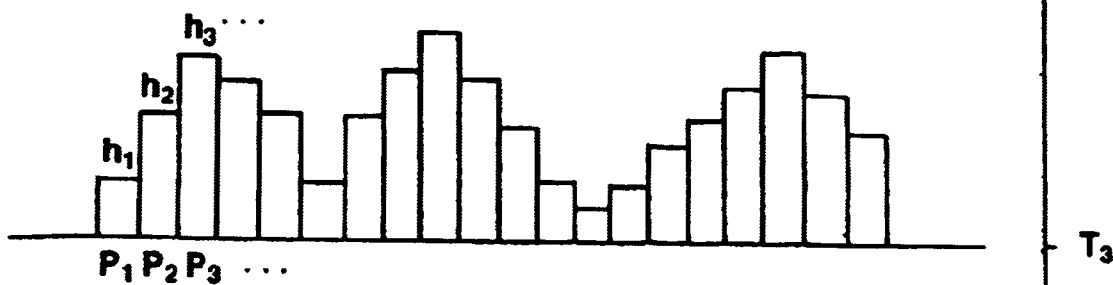
Figure 20:
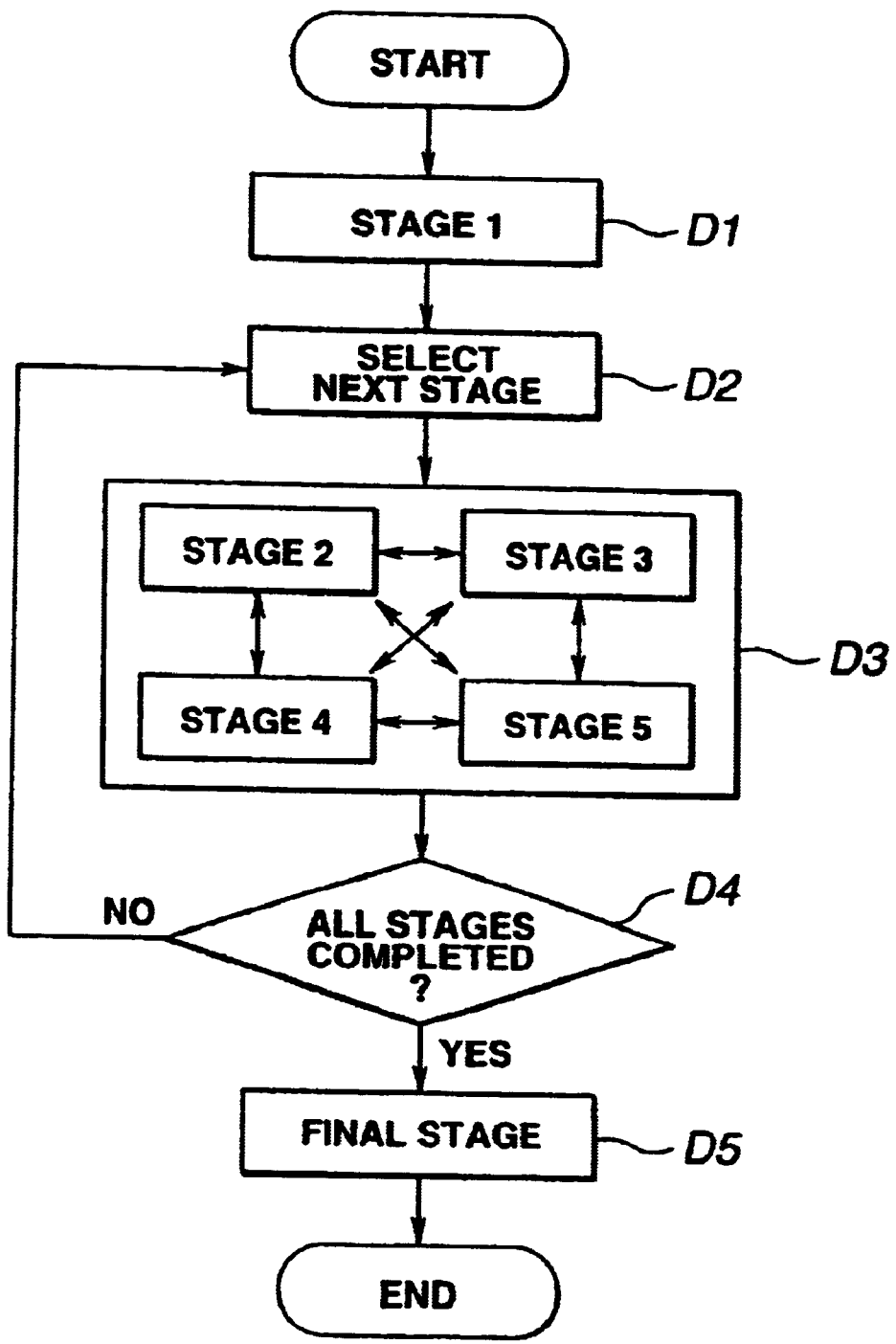
FIG. 20 is an explanatory diagram of the structure of stages in a shooting game.

Next, the configuration of game stages is explained with reference to FIG. 19. Game stages pertaining to the present embodiment are configured such that the first stage and final stage are fixed, and the player may suitably select intermediate stages. In other words, upon the start of a game, the game device automatically performs stage 1 with a predetermined program (step D1). After the completion of stage 1, the score in stage 1 is displayed on the screen. Then, a screen for selecting the next stage is displayed and the player selects the next stage (step D2). For example, if stage 3 is selected, stage 3 is performed (step D3). Thereafter, a transition to step S192 is made once again (step D4: NO), and the next stage is selected. Like this, after all stages have been completed (step D4: YES), the final stage is performed (step D5). After the completion of the final stage, the total score and so on are displayed, and it brings the game to an end.

By the intermediate stages being selected by the player and performed, the flow of the game will be in accordance with the player's intention. Further, by restricting the order of selecting the game stages or the stages selectable by a player in relation to scores of previous stages and the like, the amusement of the game is enhanced.

Evaluation Standards of Scores

There are four evaluation standards for the scores in the shooting game pertaining to the present invention.
(1) Evaluation per Enemy Plane This evaluation of the score is conducted in accordance with the method of shooting down the respective enemy characters, the time required for such shoot down, the number of bullets fired, and so forth.
(2) Evaluation per Enemy Troop An enemy character is not limited to being independent, but may also attack in troops. Thus, shorter the time required for eliminating the enemy troop, higher the evaluation. This evaluation, for example, is composed of six stages, and the bonus percentage is determined by the ranking in each of these stages.
(3) Evaluation per Stage Rankings per stage is conducted pursuant to the player's score in each stage.
(4) Evaluation per Game Rankings per game is conducted pursuant to the total score of one game.

Accordingly, by dividing the evaluation standards of scores to enemies, enemy troops, etc., score evaluation in a variety of forms is possible by the combination thereof.

Vibration Generating Mechanism

Figure 21:
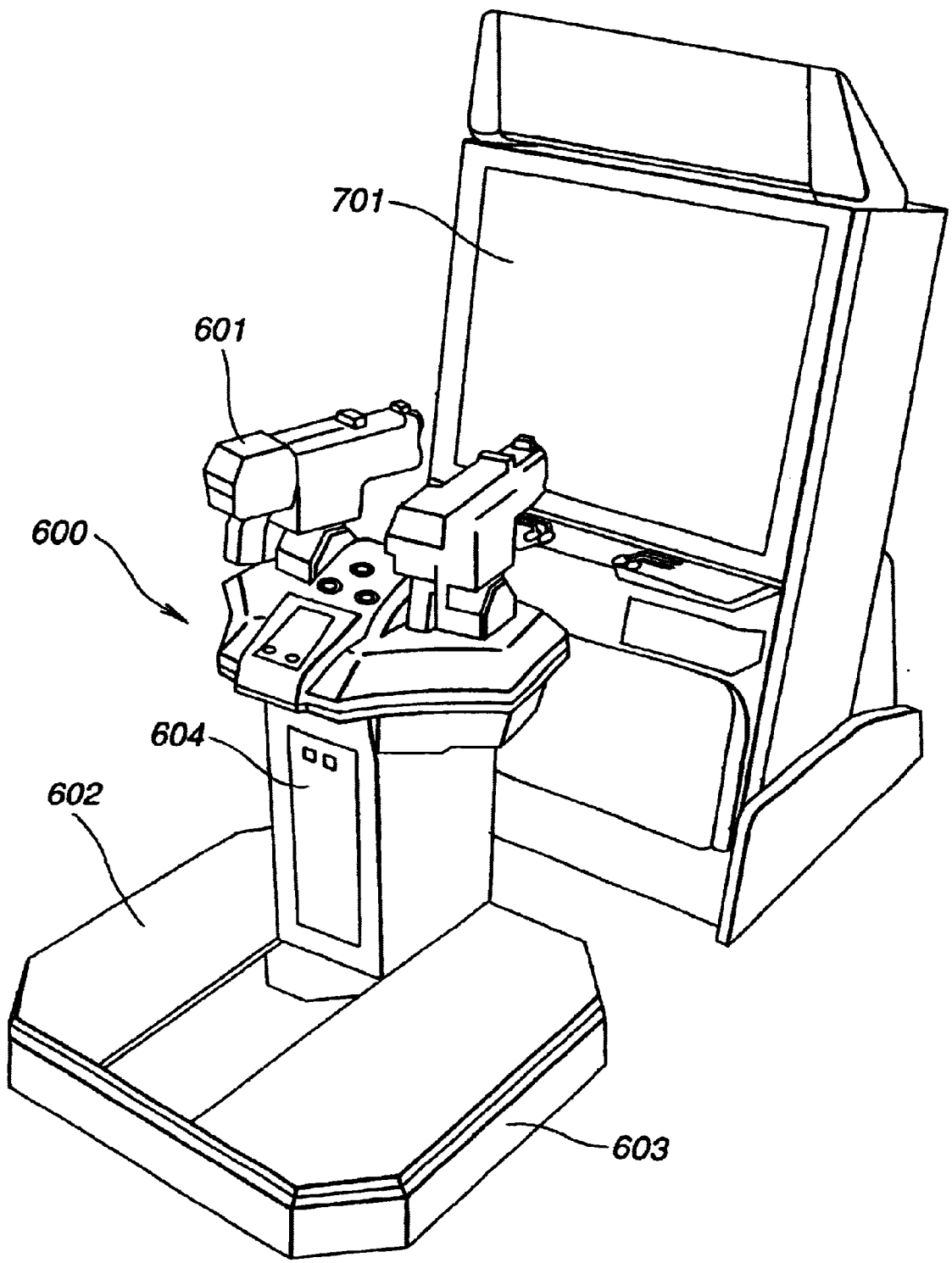
FIG. 21 is a perspective view of the body of the game device of the present invention.
Figure 22:
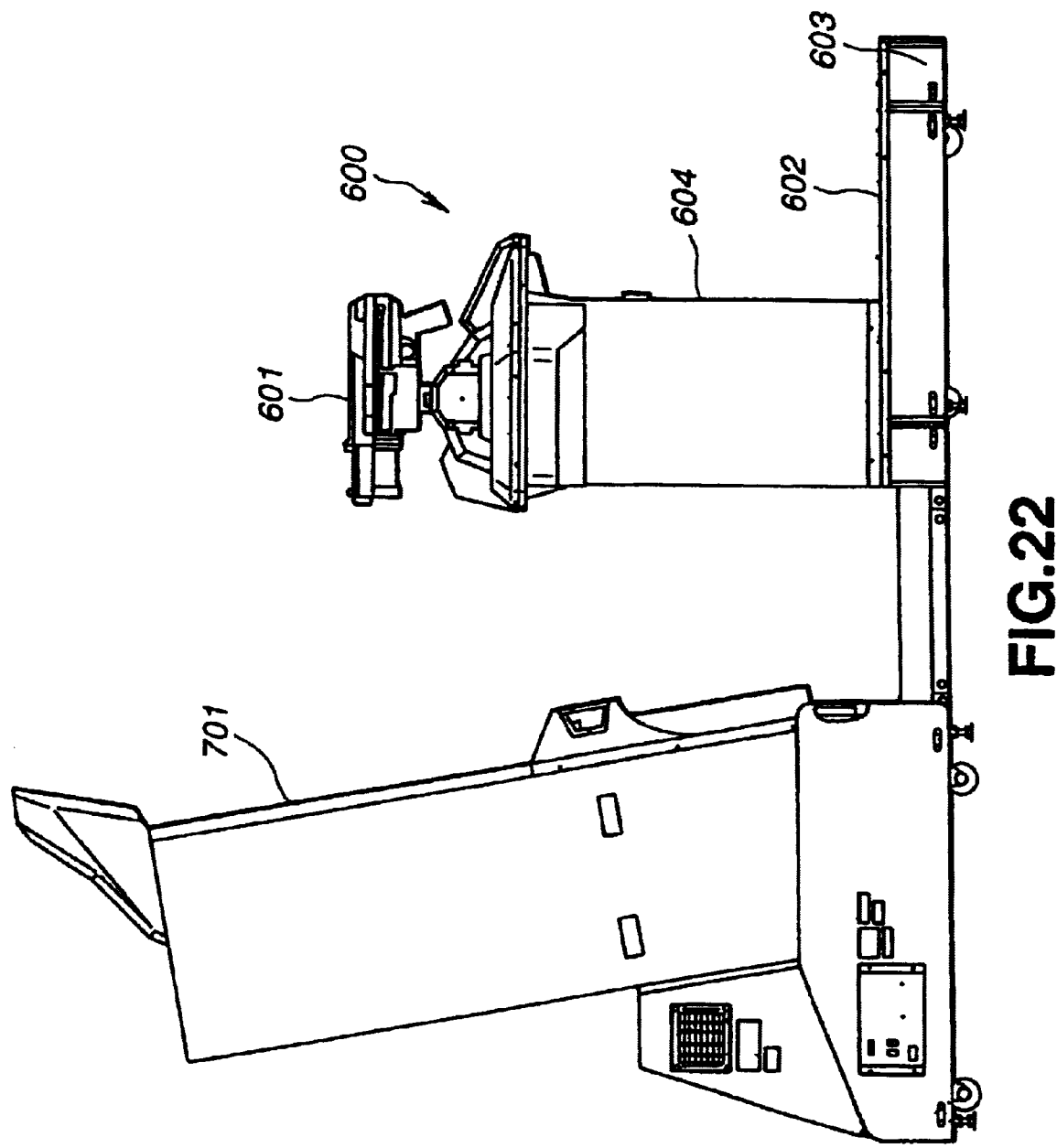
FIG. 22 is a side view of the body of the game device of the present invention.
Figure 23:
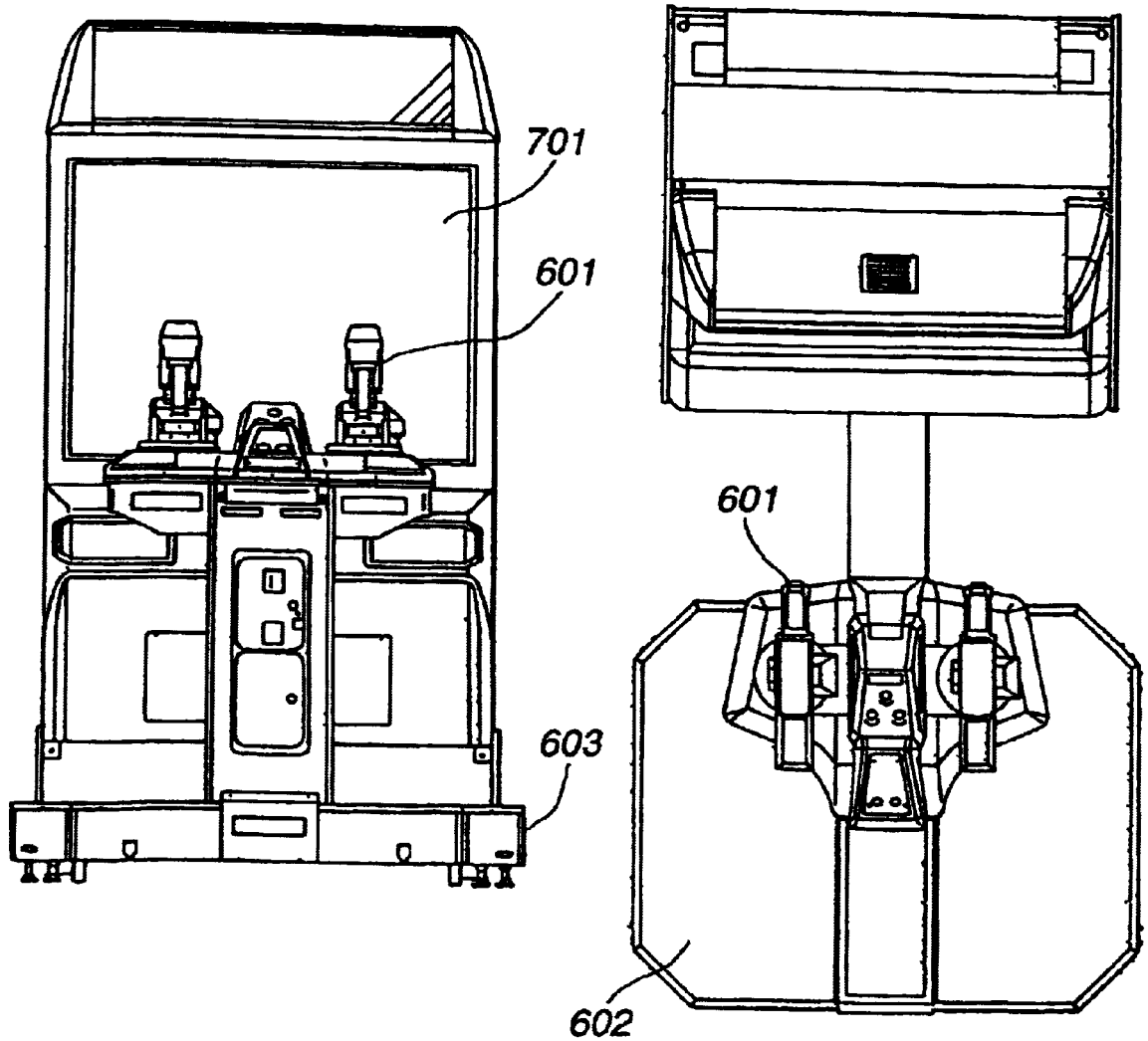
FIG. 23 including
Figure 24:
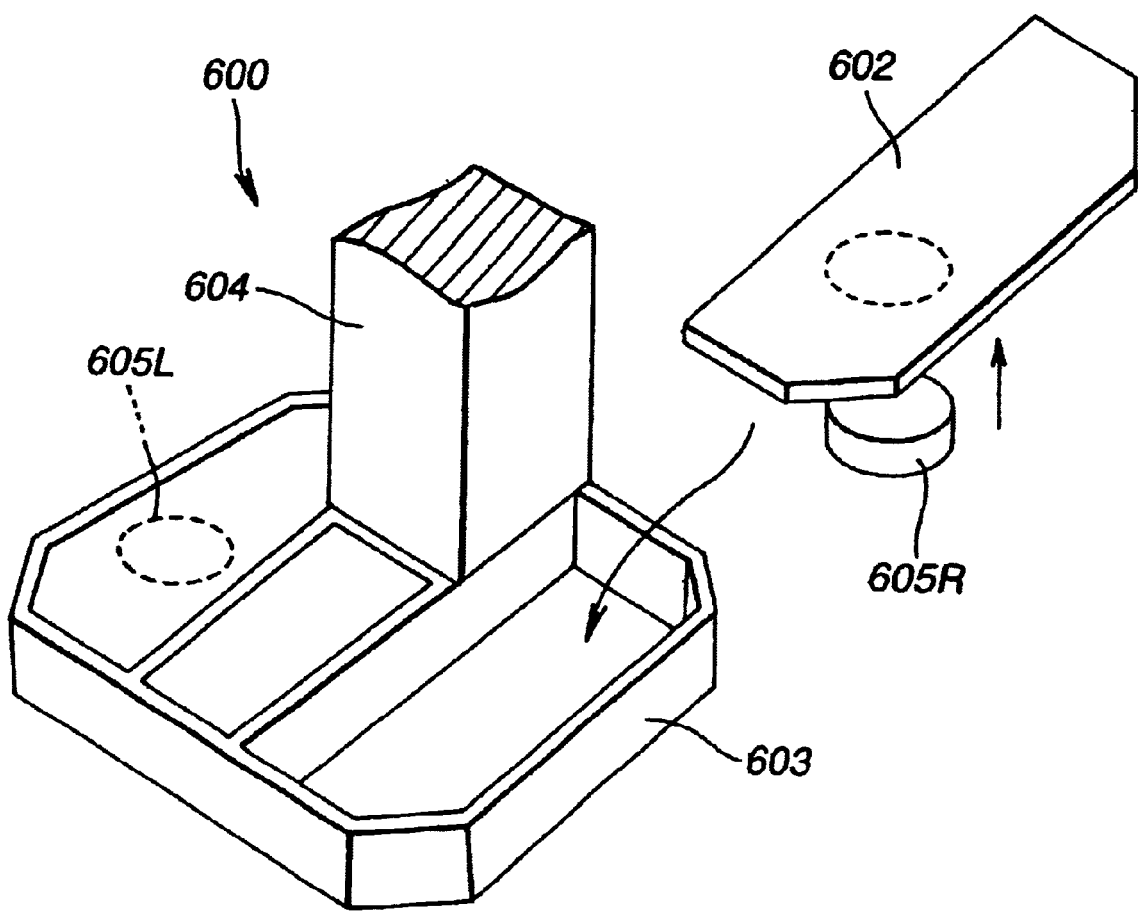
FIG. 24 is a mounting diagram of the vibration generating device.

The vibration generating mechanism in the game device of the present embodiment is explained with reference to FIGS. 21 to 25. FIG. 21 is a perspective view of a body 600 of the game device and a display 701. The body 600 has a base 603 and a prop 604, and various operation buttons and guns 601 are attached on this prop 604. The player shoots the enemy characters displayed on the display 701 by operating this gun 601. FIG. 22 is a side view, FIG. 23(A) is the front view and FIG. 23(B) is a plane view of this body. A vibration plate 602 is provided at the position where the player places his/her feet on the base 603. As shown in FIG. 24, vibration generating devices ("Base Shakers") 605R and 605L are provided on the reverse side of this vibration plate (position of the player's feet). When the bullet hits the enemy character, these Base Shakers 605R and 605L generate vibrations simultaneously with the explosion picture of such enemy character being displayed on the display 701. As Base Shakers 605R and 605L, low-frequency sound vibration generating devices may be used. Preferably used is, for example, the "130-5172" transducer manufactured by Aura company (sold by Kaga Denshi Company).

Figure 25:
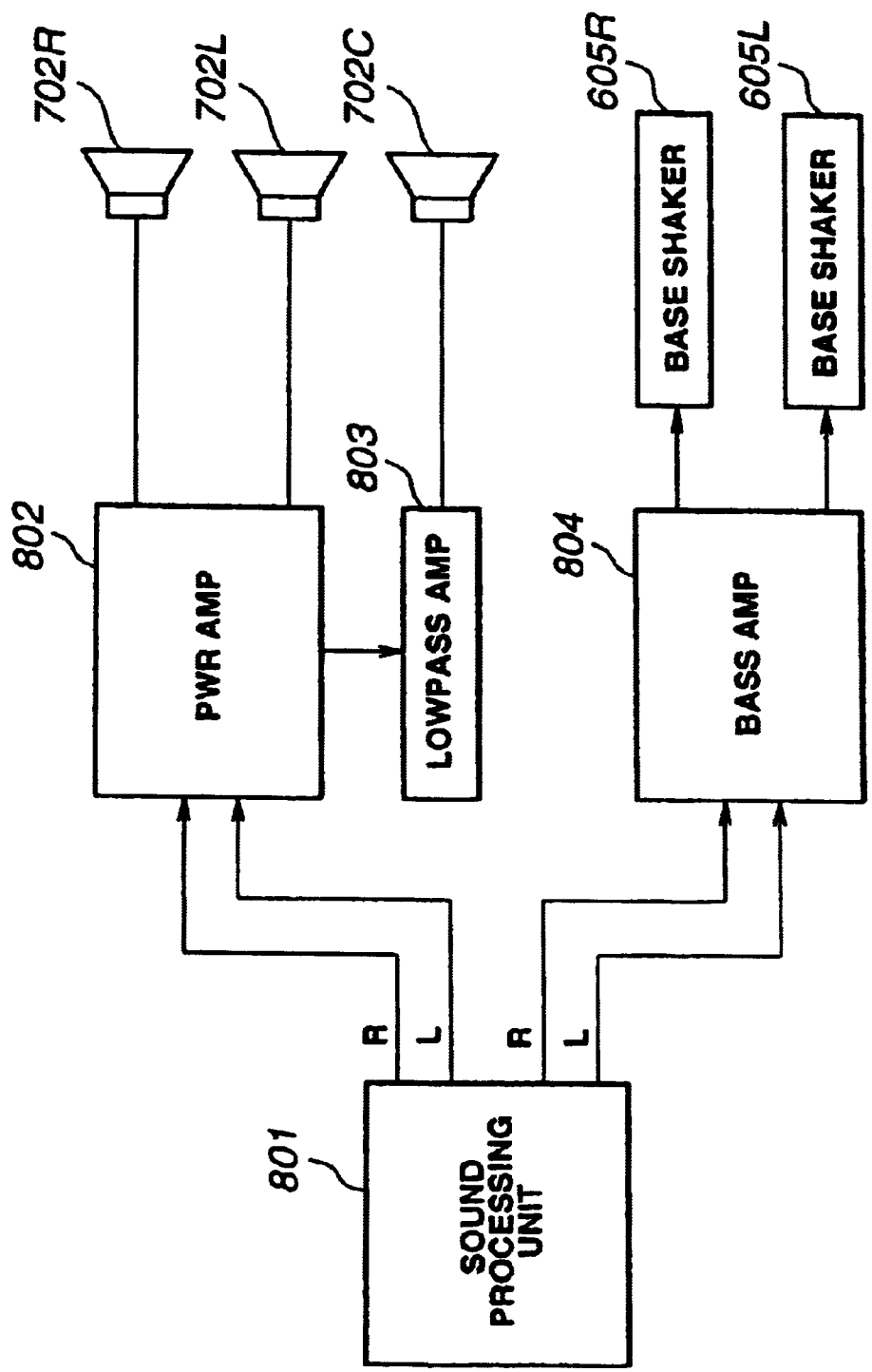
FIG. 25 is a circuit diagram of the vibration generating mechanism.

The circuitry of the vibration generating mechanism of the present embodiment is explained with reference to FIG. 25. The sound processing unit 801 comprises a sound CPU, sound memory, and D/A converter. In the sound memory, other than sound data (waveform data) such as background music set for each game scene, registered is vibration waveform data which is previously associated to each object. Sound effects such as background music predetermined for each game scene are generated by the sound CPU reading sound data (waveform data) from the sound CPU in accordance with the aforementioned game program, D/A converting this data and outputting to the amplifier 802 two-channel-signals, and outputting the result to speakers 702R and 702L. Further, low-pitch bass sounds are realized by synthesizing the aforementioned two channels in the amplifier 802, making this synthesized signal pass through the amplifier 803 having a low-pass filter, and outputting this to a woofer 702C.

Contrarily, upon generating vibrations in sync with the explosion picture of enemy characters and the like, the following method is taken. When a bullet hits the enemy character and a command for generating vibrations in sync with the explosion of the enemy character is delivered from the main CPU (not shown) to the sound CPU, the sound CPU reads from the sound memory vibration waveform data which is previously associated with each object, D/A converts this into two-channel signals and outputs the same to the amplifier 804. Signals amplified at the amplifier 804 are input to the Base Shakers 605R and 605L to vibrate the vibration plate 602.

According to the vibration generating mechanism of the present embodiment, sound data for background music and vibration waveform data pertaining to the explosion of objects are divided and registered in the sound memory such that the respective signal paths are different. Thus, it is no longer necessary to vibrate the Base Shaker with sound signals generated pursuant to sound data for background music, and suitable vibrations are generated in accordance with the scene. Moreover, the unnaturalness of the Base Shaker unnecessarily vibrating in accordance with the sound of background music may also be resolved.

What is claimed is:

1. An image processing device for displaying on a screen, upon a first object flying within a virtual three-dimensional space colliding with a second object arranged in said virtual three-dimensional space, a picture showing a change in the position of said second object, comprising:

storage means for storing a predetermined set of coordinate values of said second object;

operation means for calculating a moment said second object is subject to upon colliding with said first object and computing a set of new coordinate values of the second object after collision based on the calculated moment; and image generating means for renewing the predetermined set of coordinate values of the second object stored in said storage means pursuant to such calculation and generating images of the second object after collision based on said renewed predetermined set of coordinate values of the second object.

2. An image processing device according to claim 1, wherein said image generating means calculates the coordinate values of the second object after said collision so as to change a two-dimensional position of the second object seen from a virtual viewpoint.

3. An image processing device according to claim 1 or 2, wherein said first object is a bullet and said second object is an enemy character.

4. An image processing device for displaying on a screen a picture of a first object colliding with a second in a virtual three-dimensional space, as seen from a virtual viewpoint, comprising;

image generating means for controlling a scattering direction of a group of scattering polygons which scatter off from said second object in accordance with an energy value of the second object, said energy value decreases when said first object collides with said second object.

5. A method for displaying on a screen, upon a first object flying within a virtual three-dimensional space colliding with a second object arranged in said virtual three-dimensional space, a picture showing a change in the position of said second object, comprising steps for:

storing a predetermined set of coordinate values of said second object;

calculating a moment said second object is subject to upon colliding with said first object and computing a set of new coordinate values of the second object after collision based on the calculated moment; and renewing the predetermined set of coordinate values of the second object stored in said storage means pursuant to such calculation and generating images of the second object after collision based on said renewed predetermined set of coordinate values of the second object.

6. The method according to claim 5, wherein calculating the coordinate values of the second object after said collision so as to change a two-dimensional position of the second object seen from a virtual viewpoint.

7. The method according to claim 5 or 6, wherein said first object is a bullet and said second object is an enemy character.

8. A method for displaying on a screen a picture of a first object colliding with a second in a virtual three-dimensional space, as seen from a virtual viewpoint, comprising steps for:

controlling a scattering direction of a group of scattering polygons which scatter off from said second object in accordance with an energy value of the second object, said energy value decreases when said first object collides with said second object.

* * * * *